US012393550B2

(12) United States Patent
Berman et al.

(10) Patent No.: US 12,393,550 B2
(45) Date of Patent: Aug. 19, 2025

(54) GENERATING AND MODIFYING A COLLECTION CONTENT ITEM FOR ORGANIZING AND PRESENTING CONTENT ITEMS

(71) Applicant: Dropbox, Inc., San Francisco, CA (US)

(72) Inventors: Brendan Berman, Pacifica, CA (US); Yu-Liang Hsu, San Francisco, CA (US); Dong-Jae Chung, Belmont, CA (US); Maureen Mason, Alameda, CA (US); Jessie Engstrom, San Francisco, CA (US); Nicholas Jitkoff, Palo Alto, CA (US); Andrew Schamp, Oakland, CA (US)

(73) Assignee: Dropbox, Inc., San Francisco, CA (US)

( * ) Notice: Subject to any disclaimer, the term of this patent is extended or adjusted under 35 U.S.C. 154(b) by 32 days.

(21) Appl. No.: 17/930,507

(22) Filed: Sep. 8, 2022

(65) Prior Publication Data

US 2023/0004529 A1 Jan. 5, 2023

Related U.S. Application Data

(63) Continuation of application No. 16/567,686, filed on Sep. 11, 2019, now Pat. No. 11,461,272.

(51) Int. Cl.
*G06F 16/16* (2019.01)
*G06F 16/11* (2019.01)
(Continued)

(52) U.S. Cl.
CPC .......... *G06F 16/168* (2019.01); *G06F 16/122* (2019.01); *G06F 16/1873* (2019.01); *G06F 40/166* (2020.01); *H04L 67/06* (2013.01)

(58) Field of Classification Search
CPC .. G06F 16/168; G06F 16/1873; G06F 16/122; G06F 40/166; H04L 67/06
See application file for complete search history.

(56) References Cited

U.S. PATENT DOCUMENTS 6,940,491 B2  9/2005 Incertis Carro
6,948,116 B2  9/2005 Hailpern et al.
(Continued)

FOREIGN PATENT DOCUMENTS

JP  2016511881 A  4/2016
JP  2018005794 A  1/2018
(Continued)

OTHER PUBLICATIONS

Notice of Acceptance for Australian Application No. 2020347056 mailed on Aug. 30, 2023, 3 pages.
(Continued)

*Primary Examiner* — Andrew T Chiusano
(74) *Attorney, Agent, or Firm* — Keller Preece PLLC

(57) ABSTRACT

The present disclosure is directed toward systems and methods that efficiently and effectively generate and utilize collections of content items. For example, systems and methods described herein generate a collection content item including one or more content item references. In one or more embodiments, the collection content item can include content item references for content items located internally or externally, with granular levels of permissions settings and version controls. Additionally, in response to a detected selection of a content item reference, systems and methods described herein generate a rendering of the associated content item that can be viewed regardless of any third party software installed on the viewing client computing device.

20 Claims, 23 Drawing Sheets

(51) Int. Cl.
  *G06F 16/18*   (2019.01)
  *G06F 40/166*  (2020.01)
  *H04L 67/06*   (2022.01)

(56) References Cited

U.S. PATENT DOCUMENTS

| | | | |
|---|---|---|---|
| 7,188,308 | B2 | 3/2007 | Weise et al. |
| 7,401,097 | B1 | 7/2008 | Baer et al. |
| 7,895,243 | B1 | 2/2011 | Baer et al. |
| 8,276,090 | B2 | 9/2012 | Chen et al. |
| 8,359,365 | B2 | 1/2013 | Sitsky et al. |
| 8,788,463 | B2 | 7/2014 | Friesenhahn et al. |
| 9,286,271 | B2 | 3/2016 | Khosrowshahi et al. |
| 9,665,349 | B2 | 5/2017 | Savage et al. |
| 9,753,921 | B1* | 9/2017 | DeVincenzi ............ G06F 40/169 |
| 9,961,155 | B1* | 5/2018 | Chan ..................... H04L 61/50 |
| 2004/0193672 | A1 | 9/2004 | Samji et al. |
| 2006/0184540 | A1 | 8/2006 | Kung et al. |
| 2008/0162112 | A1 | 7/2008 | Andersen et al. |
| 2011/0296507 | A1* | 12/2011 | Khosrowshahi ...... G06F 40/134 |
| | | | 715/810 |
| 2012/0102037 | A1 | 4/2012 | Ozonat |
| 2012/0216290 | A1* | 8/2012 | Roy ..................... G06F 21/6227 |
| | | | 726/27 |
| 2014/0195976 | A1 | 7/2014 | Ow et al. |
| 2014/0215322 | A1 | 7/2014 | Gunderson |
| 2014/0215568 | A1 | 7/2014 | Kirigin et al. |
| 2014/0258350 | A1 | 9/2014 | Duval et al. |
| 2014/0351693 | A1 | 11/2014 | Glassop |
| 2015/0082198 | A1* | 3/2015 | Destagnol ............... G06Q 10/10 |
| | | | 715/753 |
| 2015/0180914 | A1 | 6/2015 | Welinder et al. |
| 2015/0180984 | A1 | 6/2015 | Poletto et al. |
| 2016/0100019 | A1 | 4/2016 | Leondires |
| 2016/0232143 | A1 | 8/2016 | Fickenscher et al. |
| 2016/0285818 | A1* | 9/2016 | Beausoleil ............. H04L 51/216 |
| 2017/0085642 | A1* | 3/2017 | Grue ..................... H04L 65/4015 |
| 2017/0147545 | A1* | 5/2017 | Amoli ................... G06Q 10/101 |
| 2017/0193001 | A1 | 7/2017 | Agrawal et al. |
| 2018/0097757 | A1 | 4/2018 | Nguyen et al. |
| 2019/0102364 | A1* | 4/2019 | Rochiramani ......... G06F 40/166 |
| 2019/0102369 | A1* | 4/2019 | Valloppillil .......... G06F 16/2358 |
| 2019/0171837 | A1* | 6/2019 | Thoren ................... G06F 16/26 |
| 2020/0265112 | A1* | 8/2020 | Fox ...................... G06F 21/6245 |

FOREIGN PATENT DOCUMENTS

| | | |
|---|---|---|
| JP | 2019506643 A | 3/2019 |
| JP | 2020525878 A | 8/2020 |
| KR | 101028871 B1 | 4/2011 |
| WO | 2019067125 A1 | 4/2019 |

OTHER PUBLICATIONS

Examination Report No. 1 for Australian Application No. 2020347056 mailed on May 12, 2023, 3 pages.

Notice of Reasons for Refusal for Japanese Application No. 2022-503987 mailed on Oct. 10, 2023, 10 pages.

Notice of Reasons for Refusal for Japanese Application No. 2022-503987 mailed on Mar. 31, 2023, 12 pages.

Examination Report No. 1 for Australian Application No. 2020347056 mailed on Dec. 23, 2022, 6 pages.

Baldonad M Q W.,"An interactive, structure-mediated approach to exploring information in a heterogeneous, distributed environment," Dec. 1997, Stanford University, ProQuest Dissertations, downloaded from https://search.proquest.com/docview/304455344, 188 pages.

Final Office Action from U.S. Appl. No. 16/567,686, mailed Mar. 23, 2022, 21 pages.

Final Office Action from U.S. Appl. No. 16/567,686, mailed Mar. 30, 2021, 17 pages.

HP Record Manager, Dec. 2014 downloaded from https://softwaresupport.softwaregrp.com/web/softwaresupport/document/-/facetsearch/attachment/KM0130 . . . , 353 Pages.

International Appl. No. PCT/US2020/029505, International Search Report and Written Opinion mailed Aug. 12, 2020, 14 pages.

International Preliminary Report on Patentability for PCT Application No. PCT/US2020/029505, dated Mar. 15, 2022, 9 pages.

Non-Final Office Action from U.S. Appl. No. 16/567,686, mailed Nov. 18, 2020, 15 pages.

Non-Final Office Action from U.S. Appl. No. 16/567,686, mailed Sep. 16, 2021, 19 pages.

Notice of Allowance from U.S. Appl. No. 16/567,686, mailed Jul. 5, 2022, 9 pages.

Notice of Reasons for Refusal for Japanese Application No. 2022-503987 mailed on Mar. 4, 2024, 6 pages.

* cited by examiner

Fig. 4M

Binder Outline

Day 5 - Mykonos — 454
www.dr| — 456
— 452

+ link a calendar event

Greece Trip

+Greece Itinerary

Cities
+Athens
+Santorini
+Mykonos

Activities
+Day 1 & 2 - Athens
+Day 3 & 4 - Santorini 450
416

B H₁ H₂

Greece Trip
Move to folder

Only me

Share  View Binder

Greece Trip
Move to folder

Only me

Binder Outline

Share    View Binder

+ link a calendar event

Greece Trip

+Greece Itinerary

Cities

+Athens
+Santorini
+Mykonos

Activities

+Day 1 & 2 - Athens
+Day 3 & 4 - Santorini
Day 5 - Mykonos — 432g

GENERATING AND MODIFYING A COLLECTION CONTENT ITEM FOR ORGANIZING AND PRESENTING CONTENT ITEMS

CROSS-REFERENCE TO RELATED APPLICATIONS

The present application is a continuation of U.S. application Ser. No. 16/567,686, filed on Sep. 11, 2019. The aforementioned application is hereby incorporated by reference in its entirety.

BACKGROUND

Recent years have seen significant improvements in online content storage (e.g., "cloud" storage). To illustrate, existing online storage systems can enable users to organize digital content (e.g., various types of files and media) into a traditional folder hierarchy with multiple folders, or layers of nested folders, and files stored within folders of the folder hierarchy. Furthermore, existing storage systems enable a user to share a folder with other users via the online storage system. Despite some of the online storage conveniences that existing storage systems offer, such systems have a number of technical problems and disadvantages.

For example, the traditional file/folder storage hierarchy of existing storage systems are inflexible when it comes to applying permission and sharing settings. In particular, existing storage systems typically apply permission and sharing settings at a folder level. Folder level permission and sharing settings are inflexible, however, and can cause inaccurate permission and sharing settings that either provide a user access to content that was meant to be restricted or does not provide a user access as desired. For example, it is often the case that a user wants to share multiple files that are stored within multiple different folders, but at the same time the user does not want to share all of the files within each of the multiple folders. The inflexible folder level permission structure of many existing storage systems, however, is not able to adequately handle such a situation.

Due to the inflexibilities of existing storage systems, such as the ones discussed above, many users use manual and awkward workarounds. For example, due to the rigidness of folder level permission settings, a user may manually create duplicative folders and save additional copies of multiple files for every individual combination of files a user wants to share with another user. However, this type of action results in an inefficient use of storage space on the online content storage system by creating multiple copies of files within the storage system. Moreover, this type of manual workaround results in additional inflexibilities and versioning inaccuracies as any changes that are made to a copy of the file are not made to other copies of the file stored in other locations.

In addition to storage inefficiencies mentioned above, existing storage systems also suffer from inefficient graphical user interfaces for accessing and viewing files stored within the online content storage system. As discussed above, existing storage systems store files in a file/folder hierarchy, and accordingly, existing systems often provide a graphical user interface that displays a hierarchy of folders and files located within folders that allows a user to select a folder and a file within a folder to view the file. This type of existing graphical user interface, however, is inefficient when a user needs to view several files or when a user wants to present several files in a specific order. In particular, in an existing storage system a user would select and open each shared file (e.g., click on each file) within a folder or within multiple different folders. Thus, for example, if a user wished to share content within several files, then the viewing user would need to select and open those several files in multiple separate steps. Moreover, even after performing the numerous steps, the result is often a haphazard display of opened windows that present the content in no particular order. Moreover, if the viewing user does not have the correct application associated with a shared file installed on their own computer, then the user may not be able to view the file at all.

Thus, there are many problems and shortcomings with regard to existing online content storage systems.

SUMMARY

Embodiments of the present disclosure provide benefits and/or solve one or more of the foregoing or other problems in the art with systems, non-transitory computer-readable media, and methods for generating and modifying a collection content item that can be shared across multiple users of a content management system. For example, the content management system can generate a collection content item (e.g., a sharable data file) that references, organizes, and provides access to other content items. In one or more embodiments, the collection content item can reference and organize content items both internal to the content management system and external to the content management system. In one or more embodiments, the content management system can provide the collection content item to a user in an editable mode wherein the user can indicate content items to add to the collection content item. In response to receiving the indication to add the content items, the content management system can add references to the storage location of the content items to the collection content item. Accordingly, the collection content item includes a collection of storage location references that allows users to access each of the referenced content items based on accessing the collection content item.

The content management system can also share or otherwise publish the collection content item to other users with granular permission settings and version controls. For example, the content management system can maintain separate permission settings associated with each content item referenced by a collection content item. Additionally, because the content management system adds references to a storage location of a base content item to the collection content item, the content management system efficiently applies any version changes made to the base content item to any viewed instances of that content item via the collection content item. Alternatively, the content management system can provide a specific version of one or more content items to users, while the live content items continue to be available for additional editing. Moreover, the content management system can render content items within the collection content item such that the content items are viewable to a user regardless of what software the user has installed a client computing device.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
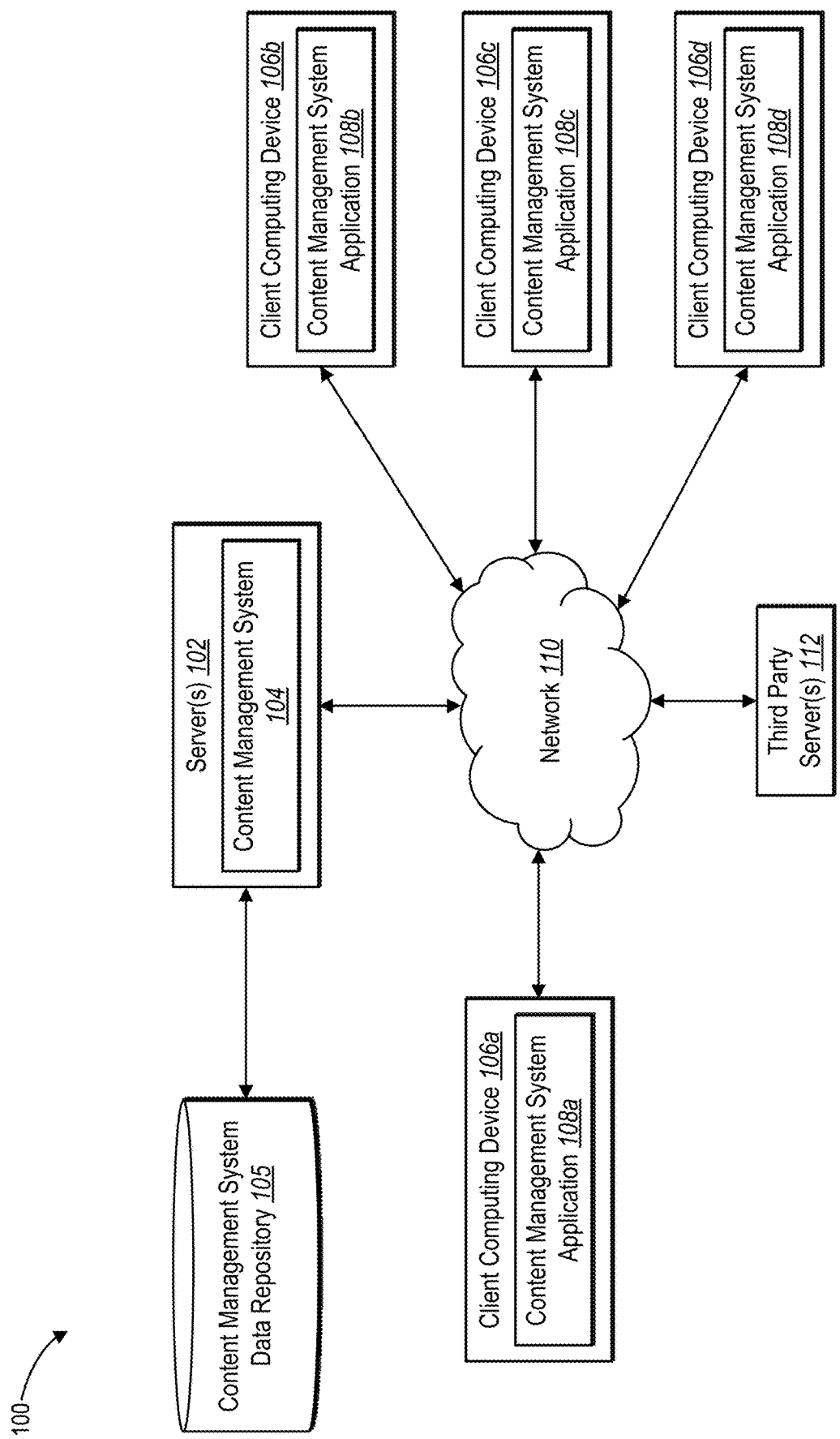
FIG. 1 illustrates a schematic diagram of a system for implementing the content management system in accordance with one or more embodiments described herein.

This disclosure describes one or more embodiments of a content management system that generates, modifies, maintains and provides collection content items that efficiently and intuitively organizes multiple content items. For example, the content management system can generate a collection content item that includes, among other things, references to storage locations of content items. The referenced content items can be located at digital storage locations either within or outside of the content management system and may include any type of digital content (e.g., PDFs, image files, video files, audio files, word processing documents, media presentations, or webpages). As such, the content management system can generate, modify, and maintain collection content items so as to provide users with an efficient, flexible, and easy way to create a sharable collection of content items that are not limited by storage location, file type, version, or permission issues.

To further illustrate, in one or more embodiments, the content management system can receive, from a client computing device, an indication of one or more content items to add to a collection content item (e.g., a data file that references and organizes the one or more content items as will be explained further below). In response to receiving this indication, the content management system can generate the collection content item including references to the one or more content items indicated by the client computing device. For example, the content management system can add, to the collection content item, references to the digital storage location of the one or more content items.

Additionally, the content management system can provide the generated collection content item to the client computing device for display. When displayed by the client computing device via a content management system application (e.g., a web browser or native application), the collection content item can include selectable references to the one or more content items. For example, in response to a detected selection of one of the selectable references in the collection content item, the content management system can provide a rendering of the content item or content items associated with the selected reference.

In one or more embodiments, the content management system can provide both an edit mode and a display mode for a collection content item. For example, while a collection content item is in edit mode, the content management system can provide an editable view of the collection content item wherein the user may add text, formatting, content item references, and so forth. Additionally, while the collection content item is in edit mode, the content management system can provide additional tools for editing content items, modifying the organization of the content items, as well as other functions described in further detail below.

In addition, the content management system can provide the collection content item in a display mode. While in display mode, the content management system can render the collection content item with a table of contents including selectable references to the content items previously added to the collection content item. In response to a detected selection of a reference within the displayed table of contents, the content management system can provide the referenced content item for display. In addition, the contentment management system can display the content items in a specified order, format, and version of content item, as will be described in detail below.

In one or more embodiments, the content management system can provide a high level of permission control granularity associated with a collection content item. For example, the content management system can enable a user to specify a permission setting associated with each content item referenced by a collection content item. Thus, when the collection content item is later shared with one or more additional users, the content management system can maintain the same permission settings for each referenced content item. In this way, when an additional user interacts with the published collection content item, the content management system may provide access to some, but not all, of the referenced content items, depending on the additional user's permission level.

In one or more embodiments, the content management system can determine the permission level of a content item that the collection content item references based on the folder permissions within which the content item is stored within the content management system. Thus, a user can combine several content items that are stored in multiple different folders, and the permissions from each of the multiple different folders is maintained for the respective content items regardless of the combination of content items referenced in the collection content item. In addition, in one or more embodiments, the content management system can provide an option to edit permissions of content items referenced in the collection content item. Accordingly, the content management system can allow a user to organize a collection of content items within a collection content item, and then easily edit the permissions associated with each of the referenced content items so that users having access to the collection content item can access each of the referenced content items.

In addition to permission control, in one or more embodiments, the content management system can provide version control for all content items referenced by a collection content item. For example, because a collection content item includes references to the digital location of a base content item (e.g., a "live" content item), the content management system can provide for display the most recent version of that content item. In other words, because the collection content item includes a reference to the storage location of the live content item, when a user accesses the collection content item, the content management system can provide the latest version of the content item. This remains true even when the collection content item is shared, re-shared, copied, and moved.

Alternatively, the content management system can provide a version lock feature that can provide a specific or fixed version of a content item within a collection content item to users (e.g., a "published version"). For example, the content management system can store various versions of a content item, and each of the versions have a specific digital storage location within the content management system. With the version lock feature, the content management system can add a reference to the digital storage location associated with a fixed version of a content item. Thus, while the live version of the content item continues to update based on any received edits, the collection content item can provide the specific version of a document. Accordingly, the content management system can provide an intuitive and efficient way to publish a specific version of a document to a group of people (e.g., an approved version), while the user responsible for the content can continue to work on the live version of the document until the next version is ready for publishing.

The content management system provides many advantages and benefits over existing systems and methods. For example, by enabling granular permission and sharing settings, the content management system is much more flexible relative to existing systems. Specifically, the content management system can enable permission and sharing settings to be set both at the file level (e.g., the content item level) and at the collection content item level. This, in turn, means that collection content item authors can share a collection content item with a group of users, but selectively disable specific users within that group from accessing certain content items within the collection content item. As such, the content management system can give collection content item authors a great deal of flexibility and control in how collection content items are shared with other users.

Additionally, by offering such granular controls relative to collection content items, the content management system avoids other pitfalls common to existing systems. Specifically, by utilizing the content management system's granular permission and sharing settings, users no longer need to create copies of files in specific folders in order to share them with a specific user or group of users, as is the case with existing systems. Instead, the content management system can allow a user to add storage references of several content items that are stored in various folders and locations to a collection content item, and then set permission levels for the collection content item without having to manually set permission levels at each of the various folders or create duplicative copies of files and folders. As such, the content management system efficiently utilizes system storage while ensuring that shared users are always seeing the correct version of files within a collection content item.

Moreover, the content management system avoids other technical pitfalls of existing systems by providing an efficient and streamlined graphical user interface in connection with a collection content item. For example, rather than the haphazard display of opened windows resulting from opening files in existing systems, the content management system can provide a single graphical user interface including a table of contents for the content items associated with the collection content item in one portion of the display, with a rendering of a selected content item in a second portion of the display. Thus, the user can make selections within the provided table of contents, and quickly view renderings of those content items; all within the same graphical user interface. Moreover, the viewing users can more efficiently and quickly access content items provided via the collection content item with fewer steps, selections, and interactions compared to having to navigate through various folders and make various individual file selections. Additionally, because the content management system can provide renderings of all different types of content items, users are not required to have specific applications and/or software installed for the purpose of viewing a content item. Additional advantages will become apparent based on the discussion below.

As illustrated by the foregoing discussion, the present disclosure utilizes a variety of terms to describe features and advantages of the content management system. Additional detail is now provided regarding the meaning of such terms. For example, as used herein, the term "content item" refers to any type of digital content available as a file. In particular, a content item can include an online cloud storage document (e.g., available via the content management system), a portable document format (e.g., "PDF") document, a Microsoft™ Office™ document, a web page document (e.g., a .html document), a uniform resource locator (e.g., "URL"), or a digital media file (e.g., a digital video file, a digital image file, a digital audio file), or any other type of digital content.

In one or more embodiments, a content item can include a collaborative content item. As used herein, the term "collaborative content item" refers to a content item that includes or is associated with collaboration information. For example, a collaborative content item may be a text document over which several users have collectively collaborated (e.g., added various portions, removed various portions, commented on various portions). In one or more embodiments, users can collaborate on a collaborative content item via a network application interface accessed via a web browser. A collaborative content item may include the text document data along with additional metadata including user information associated with the collaborators, timestamp data associated with document edits, and comment data from the various collaborators.

A content item can also include a collection content item. As used herein, the term "collection content item" refers to a content item that references other content items. For example, a collection content item can include a data structure or a data file that includes references to other content items. As used herein, a "reference" or "content item reference" refers to an identifier of the content item, wherein the identifier can identify, for example, a digital storage location of a content item or a unique ID associated with the content item. For example, the reference to a content item can include a pointer or resource locator that indicates a storage location of the content item. For example, a reference may be a pointer to an online cloud storage location of a content item, to a web server location of a content item, or to a hard drive location of a content item.

In one or more embodiments, content management system stores collection content items in the same manner as other types of content items. For example, content management system can store a collection content items in a file structure based on the name of the collection content item and/or the author of the collection content item. Content management system can store a collection content item at the server level or at the client computing device. If stored on a client computing device, content management system may store a collection content item within a visible/accessible file system, as with other types of content items. In at least one embodiment, a collection content item can reference one or more additional collection content items. Such a collection content item would create a nested tree of collection content items.

In one or more embodiments, a collection content item can also include display instructions, which can include hypertext markup language (HTML), cascading style sheets (CSS), or other types of instructions that dictate to a web browser or another type of application (e.g., a mobile app) how the collection content item should be displayed. In at least one embodiment, a collection content item, when accessed via a content management system application, has an edit mode and a display mode. As mentioned above, the content management system can provide or "publish" a collection content item to one or more additional users via the content management system application and/or a web browser.

As used herein, "permission" refers to a specific level of access associated with a content item. For example, a content item's permission setting can dictate specific users or levels of users who may view, edit, copy, share, and/or download a content item. Additionally, as used herein, a "version" of a content item refers to a copy of a content item at a specific developmental stage. For example, for various reasons, a content item may be changed, updated, or otherwise edited over time. In at least one embodiment, versions of the content item can include the content item at each stage of change. To illustrate, the content management system may create a fixed version of a content item by generating a snapshot of the content item at a specific time, and then creating a locked pointer to that snapshot. The content management system can maintain the "live" or editable content item for the content item author(s), while making the specific version of the content item available to other shared users.

FIG. 1 is a schematic image illustrating an example system 100 wherein content management system 104 operates. As illustrated in FIG. 1, system 100 includes server(s) 102 including content management system 104 and associated with content management system data repository 105. Furthermore, example system 100 also includes client computing devices 106a, 106b, 106c, and 106d on which content management system applications 108a, 108a, 108c, and 108d are installed, respectively. As shown in FIG. 1, system 100 can also include third party server(s) 112.

In at least one embodiment, client computing devices 106a-106d and server(s) 102 are communicatively coupled across network 110. Although FIG. 1 illustrates a particular arrangement of client computing devices 106a-106d, server(s) 102, and network 110, various other arrangements are possible. For example, client computing devices 106a-106d may directly communicate with server(s) 102, bypassing network 110. Additionally, in one or more embodiments, any of client computing devices 106a-106d may not include content management system application 108a-108d, respectively, but rather may utilize the features of content management system 104 via a native application or web application.

Although one or more embodiments are described herein as including client computing devices 106a-106d (e.g., smartphones), in additional embodiments, content management system 104 can operate in combination with any type of client computing device. For example, in an additional embodiment, rather than including a smart phone, system 100 can include a client computing device such as a laptop, desktop, tablet, wearable, etc. Additional examples and features of client computing devices are described below with reference to FIGS. 7 and 8.

Client computing devices 106a-106d and server(s) 102 may communicate using any communication platform or technology suitable for transporting data and/or communication signals. For example, client computing devices 106a-106d and server(s) 102 may communicate via any known communication technologies, devices, media, and protocols supportive of remote data communications, examples of which are described below with respect to FIGS. 7 and 8. In addition, in certain embodiments, client computing devices 106a-106d may communicate via network 110 with server(s) 102. Network 110 may be any suitable network over which client computing devices 106a-106d may access server(s) 102, or vice versa. Network 110 is discussed in more detail below with regard to FIG. 8.

As shown in FIG. 1, server(s) 102 includes content management system 104. In one or more embodiments, content management system 104 provides remote content storage to users (e.g., cloud storage). For example, a user with an account associated with content management system 104 can upload various types of digital content items (e.g., digital photographs, digital videos, PDF files, word processing files, etc.) to content management system 104. In at least one embodiment, content management system 104 organizes and stores uploaded digital content items within content management system data repository 105 for the user's later viewing and possible download. Additional details with respect to the content management system 104 are provided below with reference to FIG. 8.

Also further shown in FIG. 1, and as mentioned above, client computing devices 106a-106d include content management system applications 108a-108d, respectively. It will be understood that for the purpose of explanation herein, client computing device 106a is associated with an author of a collection content item, while client computing devices 106b, 106c, and 106d are associated with other content management system users with whom content management system 104 has shared the collection content item. In one or more embodiments, each of client computing devices 106a-106d are associated with different permission settings and version access controls relative to the collection content item, as will be explained further below.

In one or more embodiments, content management system application 108 can be a native application on a client computing device 106 or a network application. In one or more embodiments, content management system application 108 is an Internet browser that accesses the content management system 104. Content management system application 108 can provide one or more graphical user interfaces that enable the user to use and/or access content management system 104. For example, content management system application 108 can provide one or more interactive graphical user interfaces on a display of client computing device 106 that allow a user to cause content management system 104 to generate and provide a collection content item. In addition, content management system application 108 can provide one or more interactive graphical user interfaces on a display of client computing device 106 that enable the user to cause client computing device 106 to communicate with content management system 104 to upload digital content items, view digital content items, share digital content items, download digital content items, and so forth. In at least one embodiment, content management system application 108 also interfaces with a camera associated with client computing device 106 in order to capture digital images (e.g., digital photographs).

As further shown in FIG. 1, the system 100 includes third party server(s) 112. As mentioned above, content management system 104 enables the inclusion of content items that are not located within content management system 104, but rather are located on third party server(s) 112. In one or more embodiments, third party server(s) 112 can be a web server, a file server, or any other type of remotely accessible computing device. Accordingly, content management system 104 can communicate with third party server(s) 112 over network 110.

As will be understood based on the disclosure herein, various functions and processes of content management system 104 can be located on server(s) 102, client computing device 106, or both server(s) 102 and client computing device 106. In some embodiments, content management system 104 on server(s) 102 cooperates with content management system application 108 on client computing device 106 to provide the functions and features described herein. Alternatively, the functions and features may be performed solely on client device 106 or solely on server(s) 102 as a particular application of content management system 104 requires.

Figure 2:
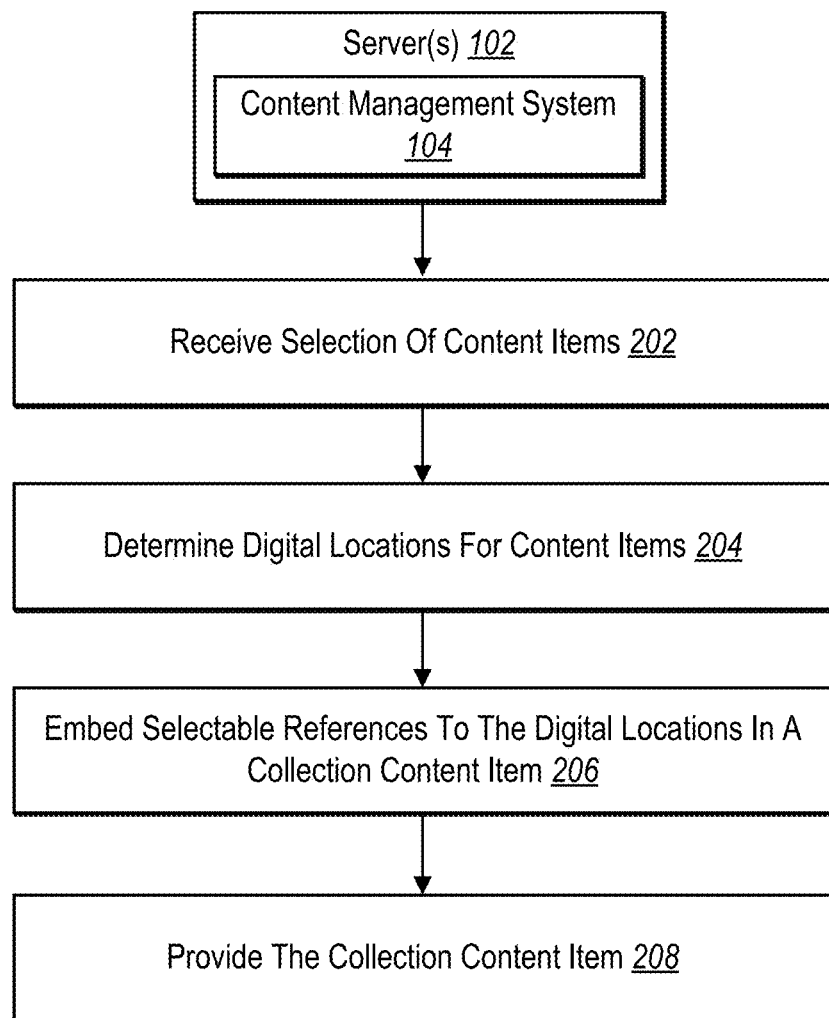
FIG. 2 illustrates an overview schematic diagram for generating a collection content item in accordance with one or more embodiments described herein.

FIG. 2 illustrates a broad overview of the features and functionality of content management system 104, as described herein. For example, as shown in FIG. 2, content management system 104 can receive a selection of content items (202). In one or more embodiments, content management system 104 receives a selection of one or more content items via a graphical user interface provided on a client computing device via the content management system application installed thereon (e.g., as with client computing device 106a and content management system application 108a). Content management system 104 may receive the selection of content items as a list of content item names, content item storage locations (e.g., memory pointers, URLs), unique IDs, and other metadata associated with each content item.

After receiving the selection of content items, content management system 104 can determine digital locations for each selected content item (204). In one or more embodiments, and as will be discussed in greater detail below, content management system 104 generates a collection content item to include a listing of selectable content item references. In response to a detected selection of a reference within a collection content item, content management system 104 locates the referenced content item from the digital location where it is stored and generates a rendering of the content item for display. As such, content management system 104 can determine digital locations for each content item based on metadata associated with each content item.

Content management system 104 can add content items to the collection content item by embedding selectable references associated with a location for each content item into the collection content item (206). For example, as will be discussed in greater detail below, content management system 104 can, for each content item, generate a selectable content item reference that includes a pointer to the digital storage location for that content item. In one or more embodiments, in response to a detected selection of a selectable content item in a collection content item, content management system 104 can extract the associated content item at the indicated digital location and render a display of the content item.

After embedding a selectable reference for each indicated content item into the collection content item, content management system 104 can provide the collection content item to a client computing device (208). For example, content management system 104 can provide the collection content item to the client computing device from which the selection of content items was received (e.g., the collection content item author). Additionally, content management system 104 can provide the collection content item to additional client computing devices (e.g., client computing devices associated with users with whom the collection content item author is sharing). Of note, the users with whom the collection content item is shared do not necessarily have to have an account with the content management system, but can simply gain access to the collection content item by the author of the collection content items sharing a link to the location of the collection content item.

Figure 3A:
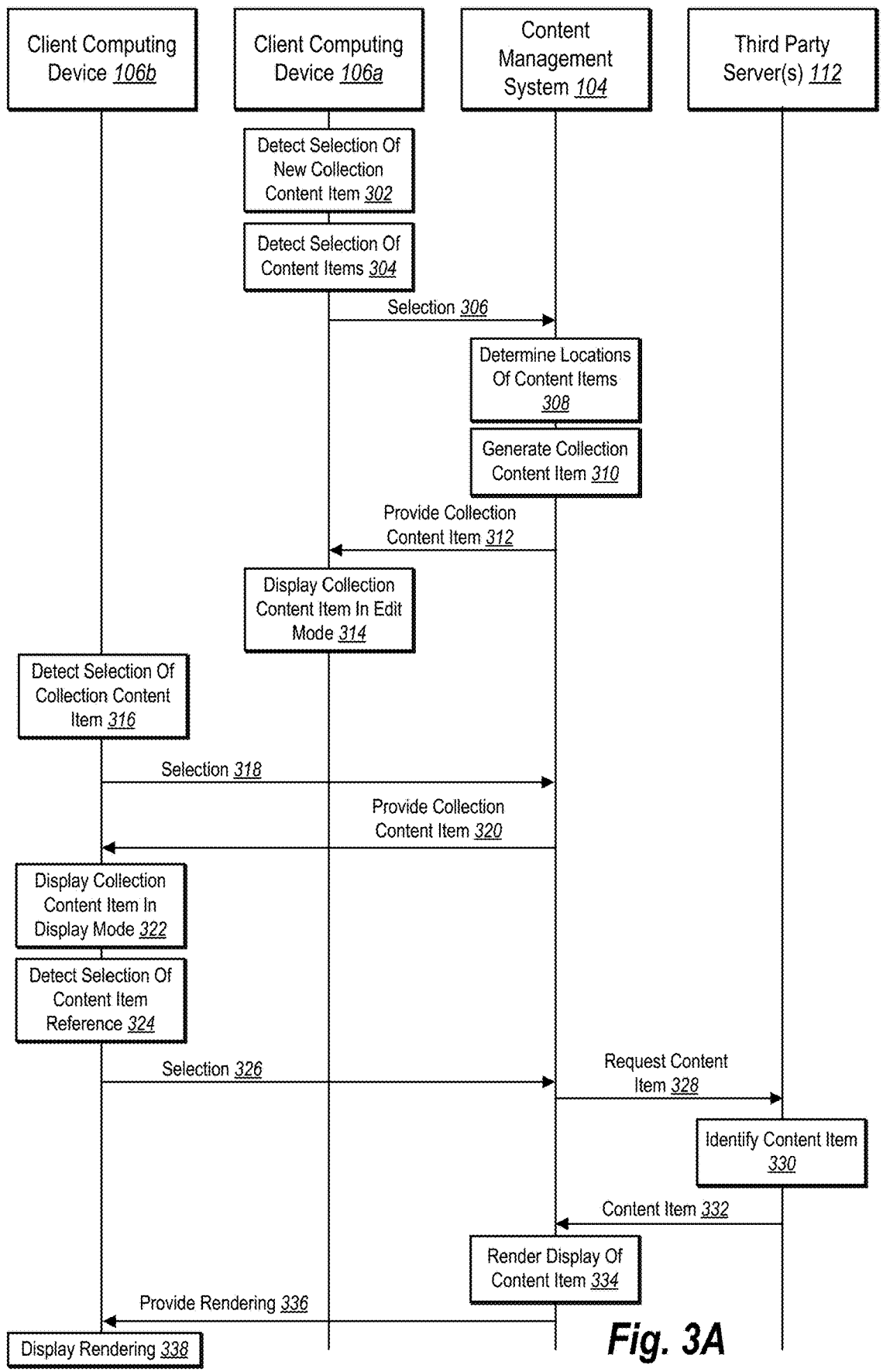
FIGS. 3A-3C illustrate schematic diagrams of processes involving collection content items in accordance with one or more embodiments described herein.
Figure 3B:
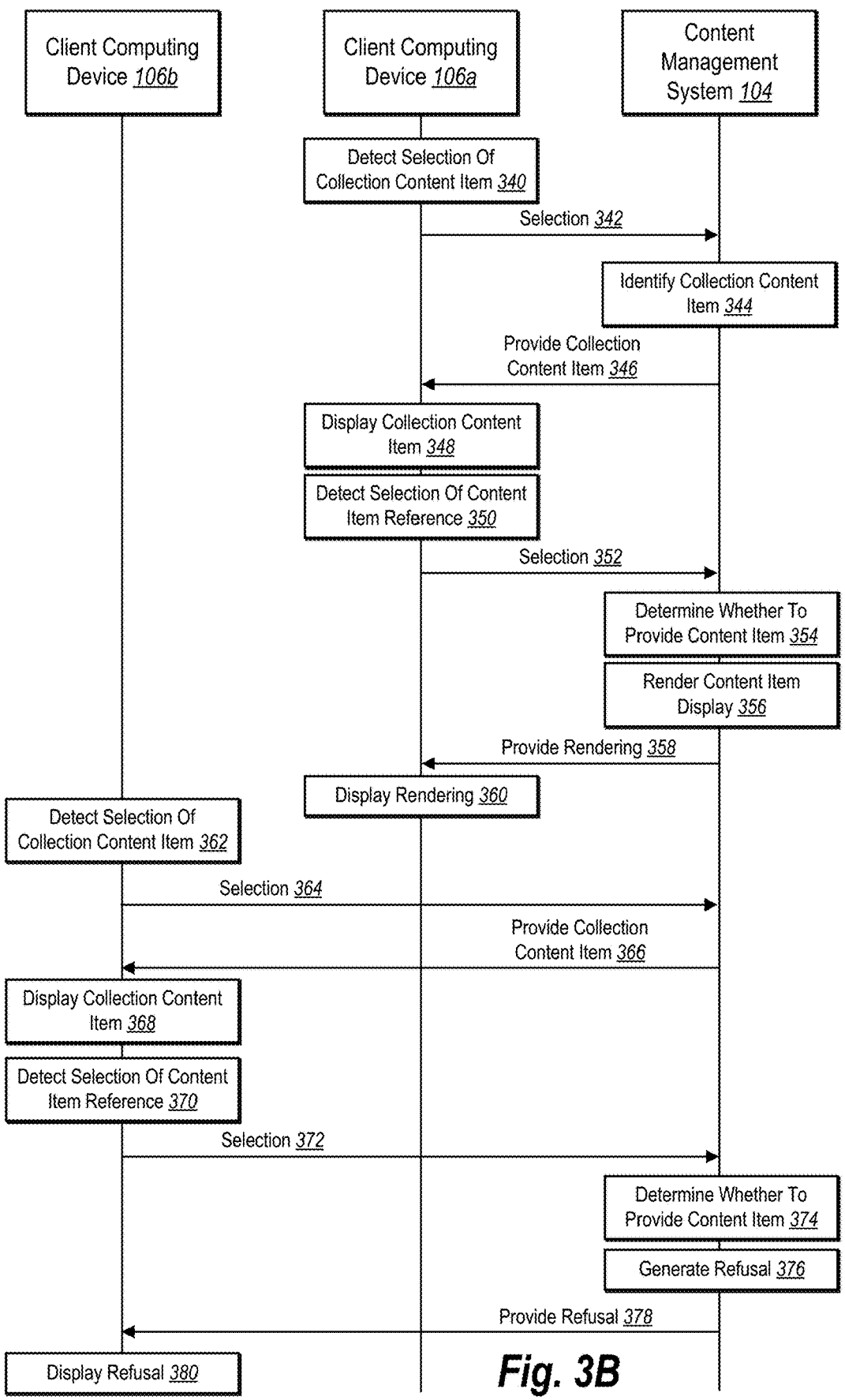
Figure 3C:
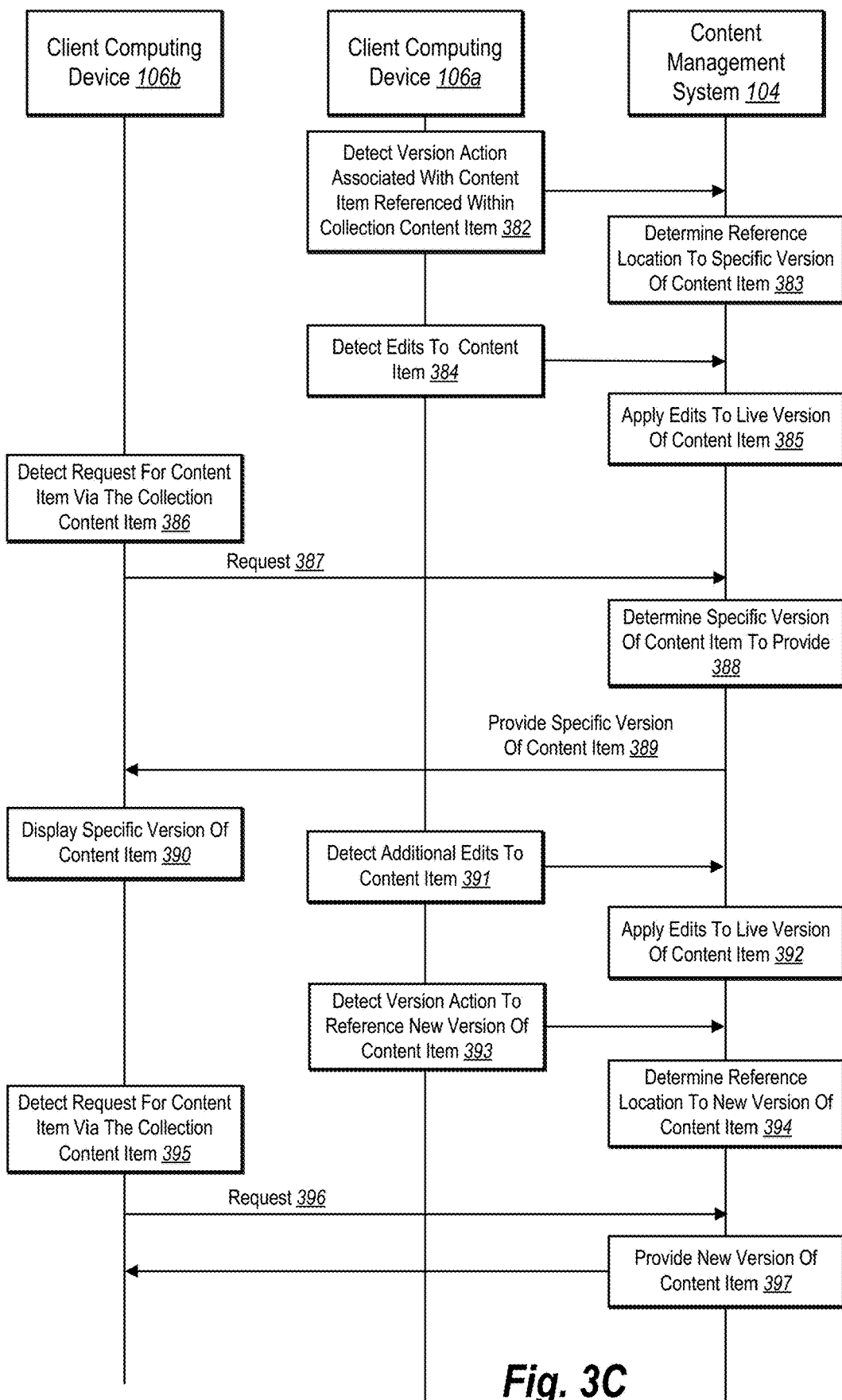

FIGS. 3A-3C illustrate sequence diagrams of content management system 104 performing acts in connection with a collection content item. For example, FIG. 3A illustrates a sequence diagram of content management system 104 generating a collection content item and providing the collection content item to one or more client computing devices.

In one or more embodiments, as shown in FIG. 3A, client computing device 106a can detect a selection of a new collection content item (302). For example, as mentioned above, content management system application 108a installed on client computing device 106a can provide a selectable option to create a new collection content item. In response to detecting a selection of the option to create a new collection content item, content management system application 108a can provide one or more graphical user interfaces that include selectable tools and options to enable the user of client computing device 106a to configure and edit a collection content item.

In at least one embodiment, client computing device 106a can detect a selection of one or more content items (304). For example, as mentioned above, content management system application 108a can detect a selection of one or more content items via one or more tools or selectable options presented via one or more graphical user interfaces. In one or more embodiments, content management system application 108a can detect the selection of content items that are local to content management system 104 (e.g., stored in content management system data repository 105), or are stored on third party server(s) 112 (e.g., web pages, PDFs, etc.). Client computing device 106a can then communicate the selections (306) of one or more content items to content management system 104.

In response to receiving the selection of one or more content items from client computing device 106a, content management system 104 can determine digital locations associated with each of the one or more content items (308). For example, in at least one embodiment, content management system 104 receives a selection of a content item as metadata including a title of the content item, a file type of the content item, and a digital storage location of the content item. In one or more embodiments, the digital storage location of the content item can be a file pointer, a URL, an IP address, or any other type of digital storage location. Accordingly, content management system 104 can determine the digital location of a content item by identifying this information within the metadata associated with the content item.

In one or more embodiments, content management system 104 can generate the collection content item (310) in association with the indicated one or more content items. For example, in at least one embodiment, content management system 104 generates the collection content item by generating a selectable content item reference for each of the one or more indicated content items, and then embedding the generated selectable content item references in the collection content item. Content management system 104 can also add additional display instructions to the collection content item (e.g., as HTML, CSS) that cause the collection content item to appear a certain way when presented in display mode. Content management system 104 can then provide the collection content item (312) to client computing device 106a. Additionally, content management system 104 can store the generated collection content item based on a user account corresponding to client computing device 106a.

In response to receiving the generated collection content item, client computing device 106a can display the collection content item in edit mode (314). In one or more embodiments, when providing a collection content item to a client computing device where the selection of content items for that collection content item was made (e.g., the "author" client computing device), content management system 104 can provide the generated collection content item in edit mode. While in edit mode, content management system application 108a can enable the collection content item to be further edited with the addition of other content items, or with changes to the display instructions associated with the collection content item. In other words, when in edit mode, the content management system 104 enables a user to edit a content item from directly within the displayed collection content item.

In addition, the content management system 104 can receive, from the client computing device, a request to directly access the content item separate from the collection content item. For example, based on a request to directly access the content item, the content management system 104 can provide, to the client computing device, the content item without providing the content collection item. This allows a user to access the content item separate from any collection to edit or otherwise edit the content item, for example. Once any edits are performed on the content item based on a direct access to the content item, then when the content management system 104 provides the collection content item that references the content item, the content item will show those edits since the collection content item references the storage location of the content item.

At any point after the collection content item is generated, client computing device 106b can detect a selection of collection content item (316). For example, the author of the collection content item may have shared the collection content item with client computing device 106b via content management system 104. Additionally or alternatively, the author of the collection content item may have added the collection content item to a repository to which client computing device 106b has access. In one or more embodiments, content management system application 108b may detect the selection of the collection content item via a graphical user interface provided on client computing device 106b. Content management system application 108b can then communicate the selection (318) of the collection content item to content management system 104. Content management system 104 can provide (320) the collection content item 320 to client computing device 106b via content management system application 108b.

In one or more embodiments, content management system application 108b displays the collection content item (322) on client computing device 106b in display mode. For example, as mentioned above a generated collection content item can have two modes; edit mode and display mode. Content management system application 108 may provide a collection content item to a client computing device in one of those two modes depending on whether the client computing device is the author client computing device, a client computing device authorized to edit the collection content item, or a client computing device authorized to view the collection content item. If the requesting client computing device is the author device or a device authorized to edit the collection content item, the content management system application installed thereon can display the collection content item in edit mode. If the requesting client computing device is only authorized to view the collection content item (e.g., as with client computing device 106b), the content management system application installed thereon can display the collection content item in display mode. Content management system 104 can provide authorization information associated with the collection content item as part of metadata associated with the collection content item.

Client computing device 106b can detect a selection of a content item reference displayed as part of the collection content item (324). For example, content management system application 108b can detect a selection of a content item reference displayed within a graphical user interface including the collection content item. Client computing device 106b can communicate the detected content item reference selection (326) to content management system 104.

In one or more embodiments, content management system 104 enables collection content items to include references to files that are local to content management system 104 (e.g., located in content management system data repository 105), and/or external to content management system 104 (e.g., stored on a client computing device hard drive or web server, such as third party server(s) 112). In at least one embodiment, content management system 104 can determine that a requested content item is located on third party server(s) 112 based on the selectable content item reference associated with the content item. For example, the selectable content item reference may include a uniform resource locator (URL) or other type of file pointer.

In response to determining that the requested content item is located on third party server(s) 112, content management system 104 can generate and send a request for the content item (328) to third party server(s) 112. Third party server(s) 112 can then identify the requested content item (330) and send the content item (332) back to content management system 104.

In one or more embodiments, content management system 104 renders a display of the content item (334) received from third party server(s) 112. For example, content management system 104 can generate a rendering of a content item by determining a file type associated with the content item, extracting any text or other media from the content item based on the file type, and adding the extracted text or other media to a preformatted display. Content management system 104 can then provide the generated rendering (336) to client computing device 106*b*, where content management system application 108*b* can display the rendering (338) as part of a graphical user interface.

FIG. 3B illustrates a sequence diagram of content management system 104 applying permission settings to a collection content item based on requests from one or more client computing devices. In one or more embodiments, as shown in FIG. 3B, client computing device 106*a* can detect a selection of an existing collection content item (340). For example, as mentioned above, content management system application 108*a* installed on client computing device 106*a* can provide a listing of existing collection content items within a display on client computing device 106*a*. In response to detecting a selection of the existing collection content item, content management system application 108*a* can communicate the selection (342) to content management system 104.

Content management system 104 can identify the selected collection content item (344) and provide the collection content item (346) to client computing device 106*a*. As discussed above, content management system application 108*a* installed on client computing device 106*a* can display the collection content item (348) in either edit mode or display mode, depending on the authorship and authorizations associated with the collection content item. Content management system application 108*a* can then detect a selection of a content item reference (350) associated with the collection content item and communicate that selection (352) to content management system 104.

In one or more embodiments, content management system 104 can determine whether to provide the content item associated with the selected content item reference (354). For example, every content item managed and provided by content management system 104 may be associated with various permission settings. In at least one embodiment, these permission settings dictate users that can interact with the content item in different ways. To illustrate, permission settings associated with a particular content item may dictate users who are authorized to: view the content item, edit the content item, share the content item, or copy the content item. Permission settings may list specific users (e.g., by username or account identifier) associated with various privileges or may list levels of users associated with various privileges.

In one or more embodiments, the content items referenced in the collection content item have permission settings in accordance with permissions settings previously stabled in the content management system 104. Specifically, because the collection content item may store a reference to the storage location of the content item within the content management system 104, that storage location may already be associated with permission settings based on the folder within which the content item is stored. For example, the content item may be stored in a folder that has an existing list of users associated with individual privileges. Thus, once the reference to the content item is incorporated within the collection content item, the list of users and associated privileges remain in effect from the collection content item without the author of the collection content item having to perform any additional file permission setting steps. This allows the author of the collection content item to easily share a set of content items via collection content item with groups of users while at the same time maintaining desired and previously defined permissions and access levels to each of the content items for each of the users.

For example, a user can cause the content management system 104 to add a first content item from a first folder and a second content item from a second folder to a collection content item. In addition, in this example, the first folder is shared with user A and not user B, while the second folder is shared with user B and not user A. In this situation, the content management system 104 can share the collection content item with both user A and user B. When user A accesses the collection content item, the content management system 104 provides user A with access to only the first content item based on the first folder already being shared with user A. The content management system 104 does not provide user A access to the second content item based on the second folder not being shared with user A. Similarly, when user B accesses the collection content item, the content management system 104 provides user B with access to only the second content item based on the second folder being shared with user B, but the content management system prevents user B from accessing the first content item based on the first folder not being shared with user B.

By using previously defined permission structures associated with content items stored within the content management system 104, the content management system 104 provides an intuitive and efficient way to control permissions to content items shared via a collection content item. In particular, the content management system 104 can maintain file permission settings to allow a user to freely share content items with groups of users while maintaining a predefined permission structure, thus ensuring an efficient and accurate application of access privileges to multiple shared content items shared with multiple users.

In one or more embodiments, the content management system provides an efficient permission setting function that easily sets the permissions for each of the content items referenced in a collection content item. For example, a user may wish to combine several content items from various folders having various different permissions with respect to each user in a group of users. However, the user may want each of the users in the group of users to have access to all of the referenced content items in the collection content item. In existing systems, a user would have to either have to create copies of content items and store all the new copies in a single folder (thereby consuming more storage space within the content management system), or the user would have to perform numerous navigation steps to manually change all the permissions of the various folders (which often is not desired because the user does not want the users in the group to access all of the content items in each of the folders). To overcome these disadvantages, the content management system 104 can provide a permission setting function that provides access to all the content items (or a select subset of content items) referenced in the collection content item.

For example, the content management system 104 can provide a permission setting menu that allows a user to select all or a portion of content items referenced within a collection content item. In addition, the content management system 104 can provide an option to provide a level of access (view, edit, share, etc.) to the selected content items for users that access the collection content item. Accordingly, with an interaction with a single button, the content management system can provide custom permissions settings to provide access to the selected content items to those users having access to the collection content item. Moreover, the content management system 104 define the specific users that have access to the collection content item.

In one or more embodiments, to provide access to content items referenced in the collection content item, upon receiving user input via the permission setting menu, the content management system 104 can associate metadata with the collection content item and the content items referenced in the collection content item that instructs the content management system to provide access to a particular content item when it is accessed from the collection content item. In other words, metadata contained within the collection content item can include access instructions that supersede defined permission levels for a specific folder. In this way, the content management system can easily provide, to a group of users, access to specific files within multiple folders without having to change the permission levels of each folder in which the content items are stored and/or create additional copies of the content items.

Continuing with FIG. 3B, and based on the principles discussed above, the content management system 104 can determine whether to provide a content item to client computing device 106a by identifying a user name, account identifier, or privilege level associated with client computing device 106a, and comparing the user name, account identifier, or privilege level to the permission settings associated with the content item. In one or more embodiments, if the user name, account identifier, or privilege level corresponds to a permission setting enabling access to the content item (e.g., for viewing), content management system 104 can render a content item display (356), as discussed above, and provide the rendering (358) to client computing device 106a. Content management system application 108a can then display the rendering (360) on client computing device 106a.

Additionally, as shown in FIG. 3B, client computing device 106b can detect a selection of the same collection content item (362) as was previously requested by client computing device 106a. Content management system application 108b can communicate the selection (364) to content management system 104, which can provide the collection content item (366) back to client computing device 106b. Content management system application 108b can display the collection content item (368) and detect a selection of the same content item reference (370) selected by client computing device 106a, above.

In response to receiving the detected selection (372) from client computing device 106b, content management system 104 can determine whether to provide the requested content item (374) to client computing device 106b. As discussed above, content management system 104 can make this determination based on a comparison of information associated with client computing device 106b and the permission settings associated with the requested content item. In at least one embodiment, client computing device 106b does not have the required user name, account identifier, or access level that enable access to the requested content item. In response to making this determination, content management system 104 can generate a refusal (376) associated with client computing device 106b.

For example, content management system 104 can generate the refusal as a pop-up window or other type of notification that includes information detailing why client computing device 106b cannot access the requested content item (e.g., "Sorry, you do not have permission to view this content item."). Additionally or alternatively, content management system 104 can generate the refusal by deactivating content item reference within the collection content item displayed on client computing device 106b. As such, content management system 104 can provide the refusal (378) to client computing device 106b where content management system application 108b displays the refusal (380).

FIG. 3C illustrates a sequence diagram of content management system 104 providing versions of content items referenced within a collection content item to one or more client computing devices. In one or more embodiments, as shown in FIG. 3C, client computing device 106a detects a version action associated with a content item within a collection content item (382). For example, as mentioned above, content management system 104 can enable versioning options associated with a content item referenced in a collection content item.

To illustrate, content management system 104 can enable a content item author to "pin" or otherwise define a specific version of a content item within the collection content item. In other words, the content management system 104 can store various versions of a content item with each version of the content item having a different storage location within the content management system 104. The content management system can provide an option for the user to select to reference the live version of a document or a specific version of a document. Thus, the collection content item can include a reference that causes the content management system to provide access to the specific version of the content item via the collection content item, while simultaneously the author of the content item can continue to edit the live content item without affecting the version within the collection content item.

Accordingly, in some embodiments, a collection content item can include references to live content items (e.g., content items that will automatically update as changes are made) and/or specific versions of content items (e.g., a locked version of a content item that does not update as changes are made to the live content item). Additionally or alternatively, client computing device 106a can detect a version action relative to an entire collection content item (e.g., relative to all referenced content items in a collection content item). In such a case, content management system 104 can automatically "pin" or otherwise lock the current version of each content item referenced in the collection content item. For example, based upon a version action, the content management system 104 can determine a reference for the current specific version of each content item referenced in the collection content item so that even when the live documents update with user changes, the collection content item continues to provide access to the corresponding specific versions.

Accordingly, as shown in FIG. 3C, in response to receiving an indication of the detected version action (382), content management system 104 can determine a reference location to a specific version of the content item (383). For example, content management system 104 can determine the storage location of the specific version of the content item referenced within the collection content. In some embodiments, content management system 104 can update the content item references within the collection content item so that they no longer point to the live content items, but rather point to the specific versions of the content items stored within the content management system 104. In one or more embodiments, the storage location reference of the specific version includes versioning information (e.g., a creation timestamp, a version number).

While the collection content item references the specific version of the content item, the content management system 104 can continue to update the live version of the content item based on edits received from the author, for example. For example, and as illustrated in FIG. 3C, client computing device 106a can detect and provide edits to the live content item collection content item (384). For example, as just mentioned, when content management system 104 references a specific version of a content item within a collection content item, a content item author can continue to edit the live content item while the specific version of the content item remains unchanged when accessed via the collection content item. Accordingly, upon receiving the edits, content management system 104 can apply the received edits to the live content item (385) without affecting the version referenced in the collection content item.

To further illustrate, client computing device 106b can detect a request for the content item via the collection content item (386) and can communicate the request (387) to content management system 104. In response to receiving the request, content management system 104 can determine the specific version of the content item to provide (385) to client computing device 106b. For example, content management system 104 can determine to provide the specific version of the content item based on metadata associated with the reference in the collection content item. Accordingly, content management system 104 can provide the specific version of the content item to client computing device 106b (389), where content management system application 108b displays the specific version of the content item (390).

In one or more embodiments, even though the content management system 104 provides the specific version of the content item, client computing device 106a can continue detecting additional edits to the live version of the content item (391), as shown in FIG. 3C. Moreover, in response to receiving the additional edits, content management system 104 can apply the additional edits to the live version of the content item (392). At some point, the author making edits to the live version of the content item may wish to publish a new version of the content item via the collection content item. At this point, the client computing device 106a can detect a version action to reference a new version of the content item (393) within the collection content item. For example, the content management system 104 can provide an update option associated with a referenced content item that a user can select to automatically reference the new version of a content item.

Upon receiving an indicating of the version action to reference the new version of the content item, the content management system 104 can determine the reference location to the new version of the content item (394), as shown in FIG. 3C. For example, the content management system 104 can replace, within the collection content time, the reference to the specific version of the content item with a reference to the new version of the content item. As with the specific reference, the reference to the new version may simply reference the new version and not the live document. In alternative embodiments, the content management system can receive input that causes the content management system to update a reference to a live version of the content item.

Moreover, after adding the reference location of the new version of the content item to the collection content item, the client computing device 106b can detect and send a request for the content item via the collection content item (395). Based on the reference within the collection content item now referencing the new version of the content item, the content management system 104 provides the new version of the content item (397), as illustrated in FIG. 3C. Accordingly, the content management system 104 described herein provides a flexible versioning process that efficiently allows for the publishing of specific document versions while also maintaining a live document for editing and updating. Unlike existing systems that are typically limited to only sharing the live document version, the content management system described herein provides a flexible and efficient way to generate and share specific versions of documents, live versions of documents, and update both the live versions and static specific versions based on user settings.

As will be described in more detail below, content management system 104 can generate, modify, and provide one or more graphical user interfaces. For example, content management system 104 can allow a user to interact with a collection of display elements for a variety of purposes in connection with a collection content item, as described above. In particular, FIGS. 4A-4N and the description that follows illustrate various example embodiments of graphical user interfaces and features in accordance with the features and functions as described above.

Figure 4A:
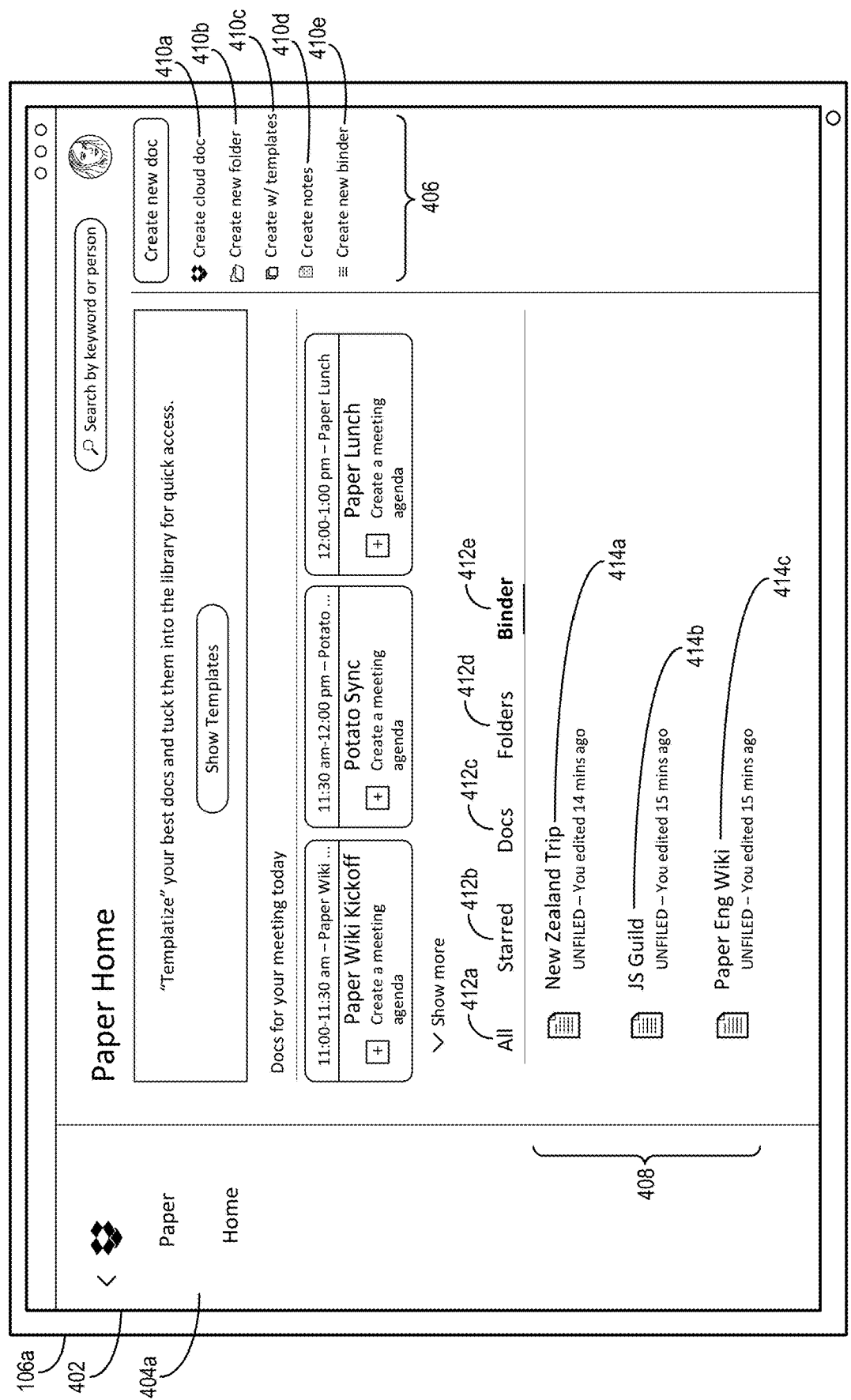
FIGS. 4A-4N illustrate example graphical user interfaces of the content management system in accordance with one or more embodiments described herein.

In one or more embodiments, content management system 104 can provide graphical user interfaces to client computing device 106a via content management system application 108a installed thereon. For example, FIG. 4A illustrates client computing device 106a displaying content item organization GUI 404a on display 402. In one or more embodiments, client computing device 106a is a handheld device, such as a smartphone. As used herein, the term "handheld device" refers to a device sized and configured to be held/operated in a single hand of a user. In additional or alternative examples, client computing device 106a may be any other suitable client-computing device, such as, but not limited to, a tablet device, a laptop, a smart-wearable device, and/or any other suitable computing device. Any of these computing devices may perform one or more of the processes and/or operations described herein.

As shown, content management system 104 provides various display areas and display elements as part of content item organization GUI 404a. In one or more embodiments, content item organization GUI 404a includes new content items list 406 and existing content items control 408. For example, new content items list 406 includes new content item buttons 410a, 410b, 410c, 410d, and 410e. Additionally, existing content items control 408 includes content item type buttons 412a, 412b, 412c, 412d, and 412e.

In one or more embodiments, content management system 104 can provide a display of existing content items by type in response to detected selections of content item type buttons 412a-412e. For example, in response to a detected selection of content item type button 412a, content management system 104 can provide a display of all existing content items associated with a user account that corresponds to client computing device 106a. Similarly, in response to a detected selection of content item type button 412b, content management system 104 can provide a display of all existing "starred" or favorite content items associated with the user account corresponding to client computing device 106a.

Furthermore, in response to detected selections of content item type buttons 412c-412e, content management system 104 can provide display of document content items, folders of content items, and "binder" or collection content items, respectively. For instance, as shown in FIG. 4A, in response to a detected selection of content item type button 412e, content management system 104 can bold content item type button 412e and can provide a list of selectable collection content item buttons 414a, 414b, and 414c within existing content items control 408. In response to a detected selection of one of selectable collection content item buttons 414a-414c, content management system 104 can provide a display of the associated collection content item.

As further illustrated in FIG. 4A, content management system 104 enables a user to configure a new content item via new content items list 406. For example, in response to a detected selection of new content item button 410a, content management system 104 can provide one or more controls that enable a user to configure a new cloud storage document. Additionally, in response to a detected selection of new content item buttons 410b, 410c, or 410d, content management system 104 can provide one or more controls that enable a user to configure a new folder, a new template-based content item, or a new note, respectively.

Figure 4B:
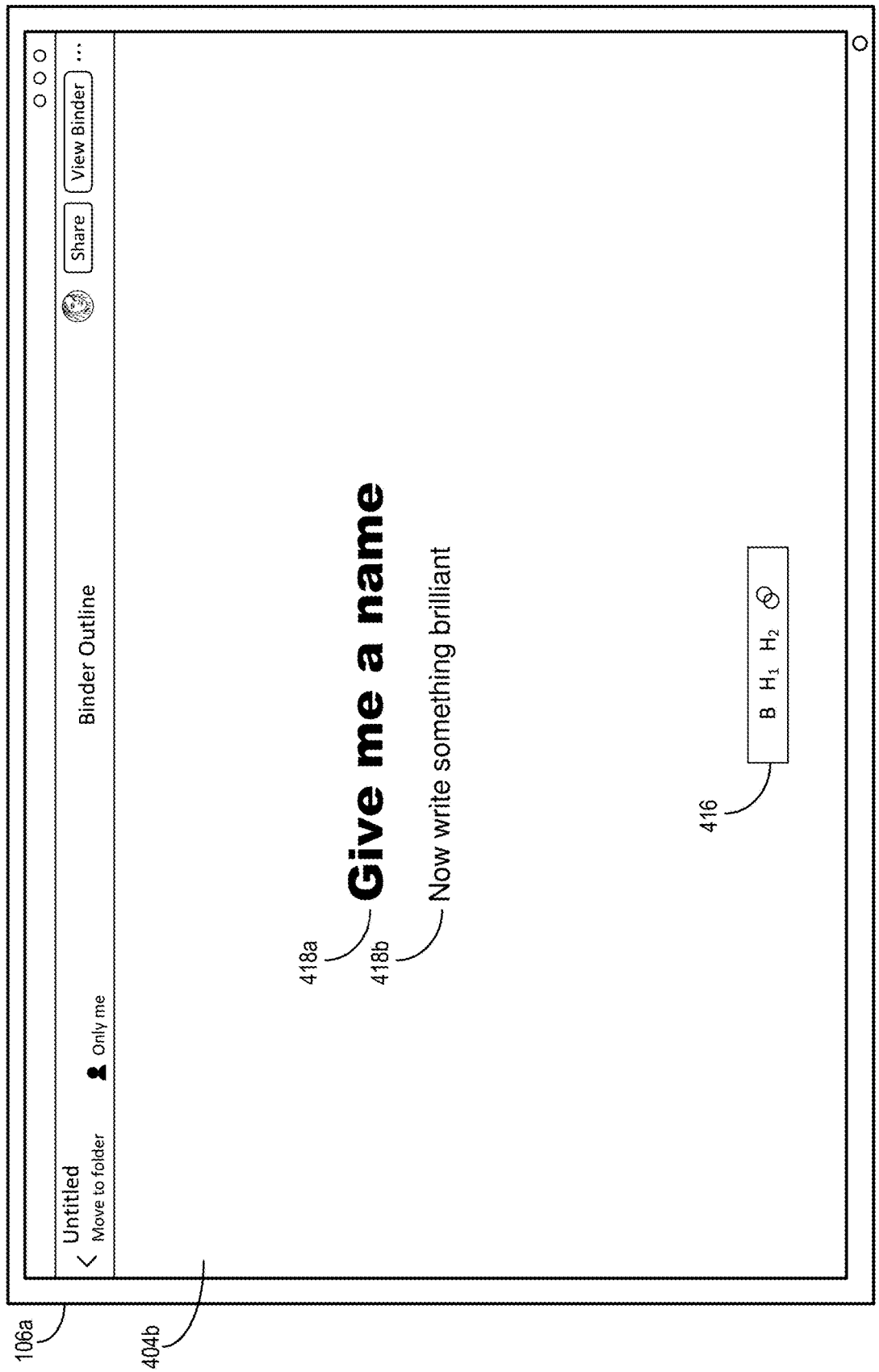

In response to a detected selection of new content item button 410e, content management system 104 can provide one or more controls that enable a user to configure a new collection content item (e.g., a new "binder"). For example, as shown in FIG. 4B, in response to the detected selection of new content item button 410e, content management system 104 can provide collection content item configuration GUI 404b. In one or more embodiments, collection content item configuration GUI 404b can include toolbox 416. In at least one embodiment, toolbox 416 can include selectable options for configuring font size and color, inserting hyperlinks, and more.

Figure 4C:
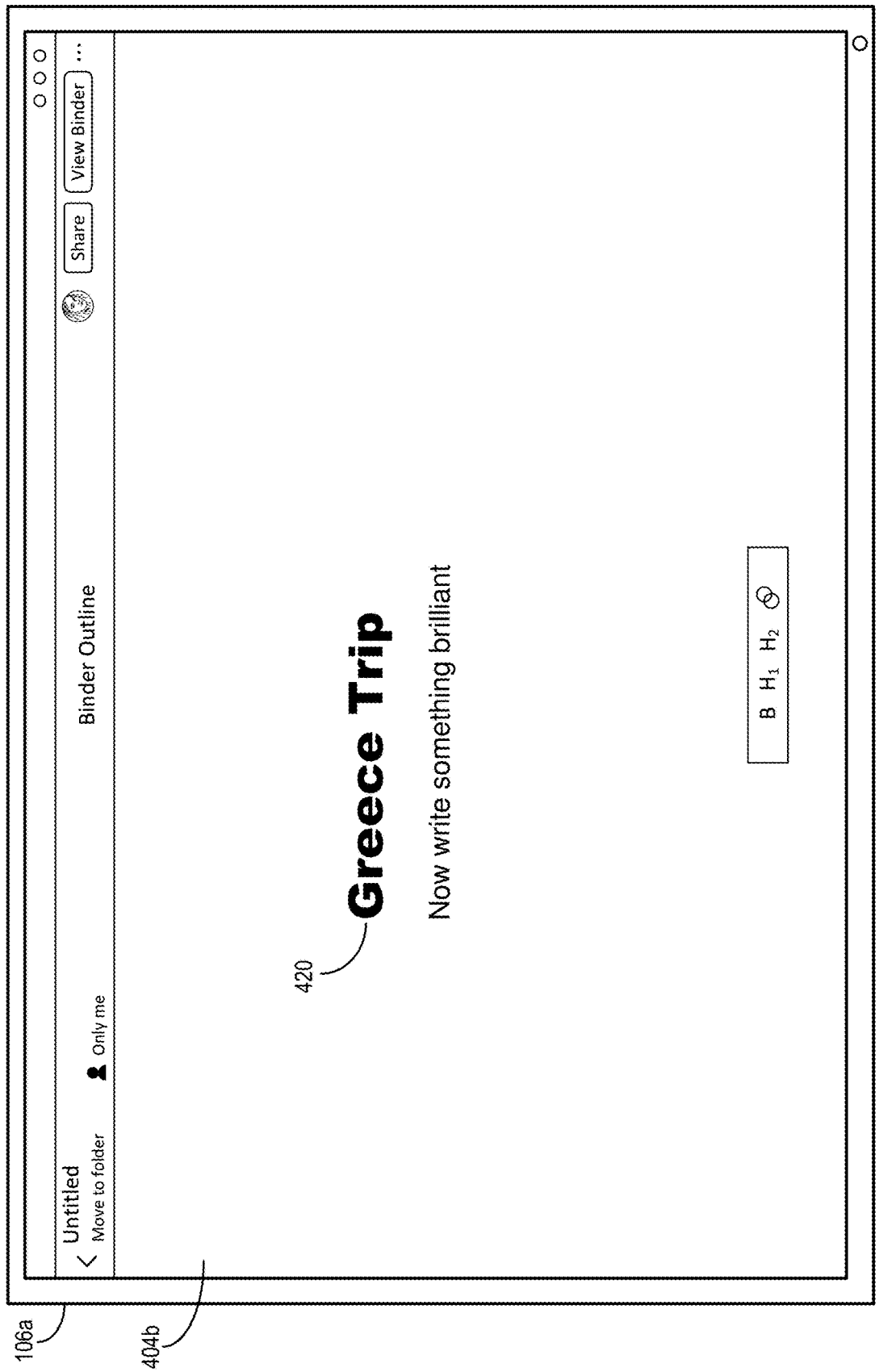

As further shown in FIG. 4B, collection content item configuration GUI 404b can also include prompts 418a, 418b. In one or more embodiments, prompts 418a, 418b enable a user to add various types of content to a collection content item configured via collection content item configuration GUI 404b. For example, in response to a detected selection of either of prompts 418a, 418b, content management system 104 can enable a user of client computing device 106a to add text and/or a content item reference. For example, as shown in FIG. 4C, in response to a detected selection of prompt 418a, content management system 104 can enable the user to type in title 420 associated with the collection content item (e.g., "Greece Trip").

Additionally, as mentioned above, content management system 104 can enable a user to add content items to a collection content item via collection content item configuration GUI 404b. For example, as shown in FIG. 4D, in response to a detected selection of prompt 418b, content management system 104 can remove any previous instruction text and can enable a user to add a content item by typing in the content item name and/or by pasting a hyperlink associated with the content item.

Figure 4D:
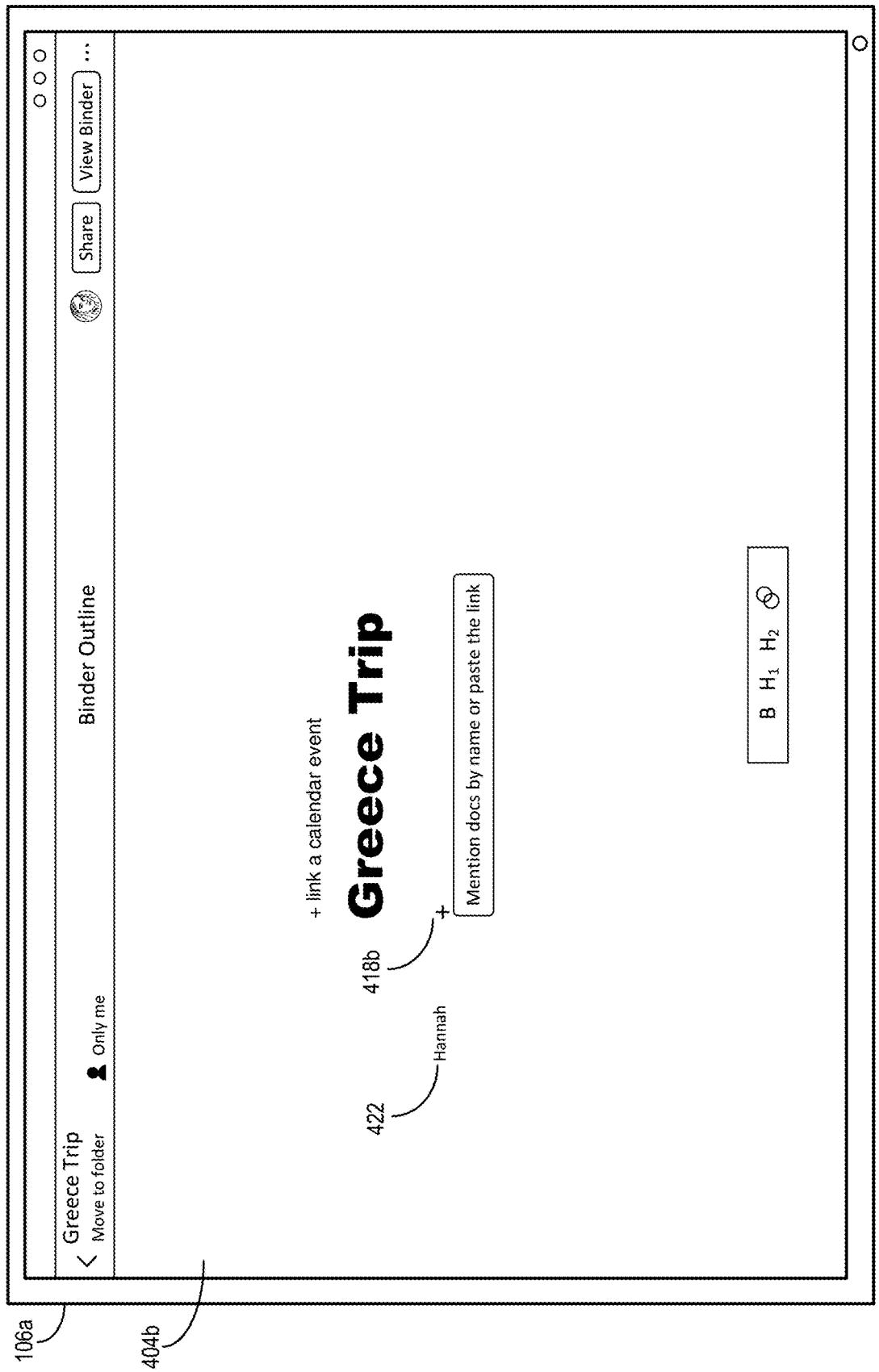

As further shown in FIG. 4D, when a user adds content items to a collection content item via collection content item configuration GUI 404b, content management system 104 can provide user indicator 422 specifying the user's name. In one or more embodiments, content management system 104 adds the user's name to metadata associated with the collection content item so as to keep track of which user added a content item to the collection content item and when the content item was added. In this way, content management system 104 can provide a complete record of how the collection content item was configured.

Figure 4E:
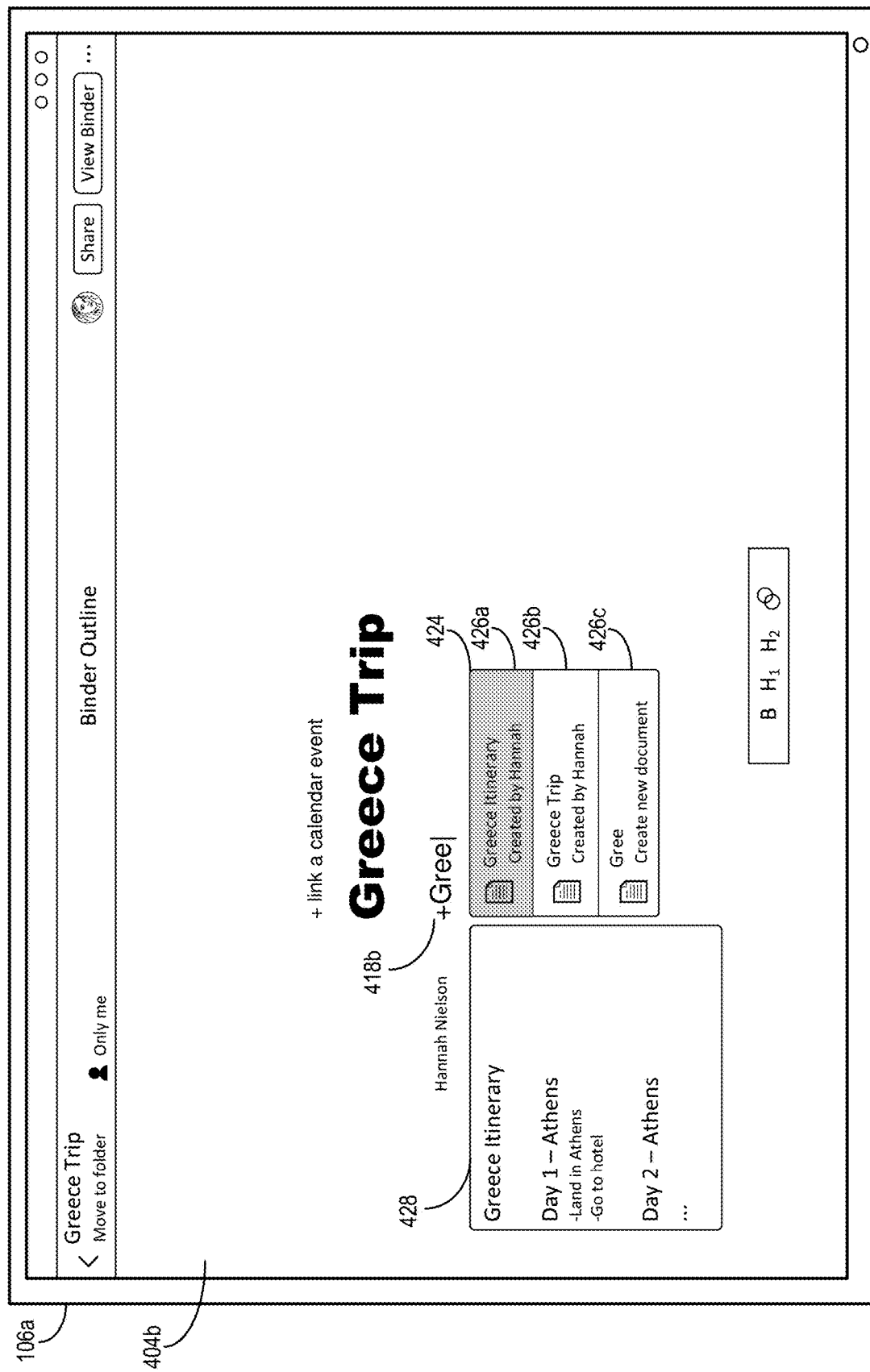

In response to continued input via prompt 418b, content management system 104 can provide additional selectable options. For example, as shown in FIG. 4E, in response to continued detected user input via prompt 418b, content management system 104 can utilize predictive text features to provide options list 424 including selectable options 426a, 426b, and 426c. In one or more embodiments, content management system 104 provides selectable options 426a-426c in response to identifying one or more content items stored within content management system 104 that have titles corresponding to the text input into prompt 418b. To illustrate, in response to the user typing "Gree" into prompt 418b, content management system 104 can identify content items with the titles "Greece Itinerary," and "Greece Trip."

In response to a detected interaction (e.g., a hover-over) associated with one of the selectable options 426a-426c, content management system 104 can provide preview window 428. In one or more embodiments, content management system 104 provides preview window 428 by identifying a content item associated with the selectable option (e.g., selectable option 426a) and rendering a partial display of that content item. For example, content management system 104 can render the partial display within preview window 428 to include the first n lines of text from the associated content item, to include one or more digital media items associated with the content item, or to include the most interacted with portion of the associated content item.

In at least one embodiment, content management system 104 can enable a user to generate a new content item via collection content item configuration GUI 404b. For example, as shown in FIG. 4E, in response to a detected selection of selectable option 426c, content management system 104 can generate a new content item with a title that matches the user input via prompt 418b. In one or more embodiments, and after generating a new content item in response to a detected selection of selectable option 426c, content management system 104 can enable the user to further edit the new content item by selecting a selectable reference associated with the new content item via collection content item configuration GUI 404b, as will be described further below.

In response to adding a content item to the collection content item, content management system 104 can continue to add additional prompts within collection content item configuration GUI 404b in order to enable a user to indicate additional content items. In this manner, content management system 104 can compile a listing of content items associated with the collection content item represented within collection content item configuration GUI 404b. For example, as shown in FIG. 4F, content management system 104 can compile table of contents 338 including title 420, subheadings 430a, 430b, and content item references 432a, 432b, 432c, 432d, 432e, and 432f.

In one or more embodiments, content management system 104 generates each of the content item references 432a-432f in response to detected user input via a prompt, as discussed above. In at least one embodiment, content management system 104 generates a content item reference by identifying a digital location associated with an indicated content item. For example, in response to a user inputting a content item title via a prompt, as discussed above, content management system 104 can identify a digital location (e.g. a storage location) associated with that content item. Content management system 104 can then generate a content item reference for that content item by generating a selectable pointer directed to the identified digital location. As such, in at least one embodiment, content management system 104 generates table of content 338 as a list of location pointers, in addition to any titles, headings, and sub-headings.

As mentioned above, content management system 104 can provide a collection content item in an edit mode or in a display mode. While a collection content item is in edit mode, as discussed with reference to FIGS. 4A-4F, content management system 104 can provide editing tools and can enable a user to add content and content items to the collection content item. As will now be discussed, content management system 104 can provide the collection content item in display mode in response to different types of detected user selections.

Figure 4F:
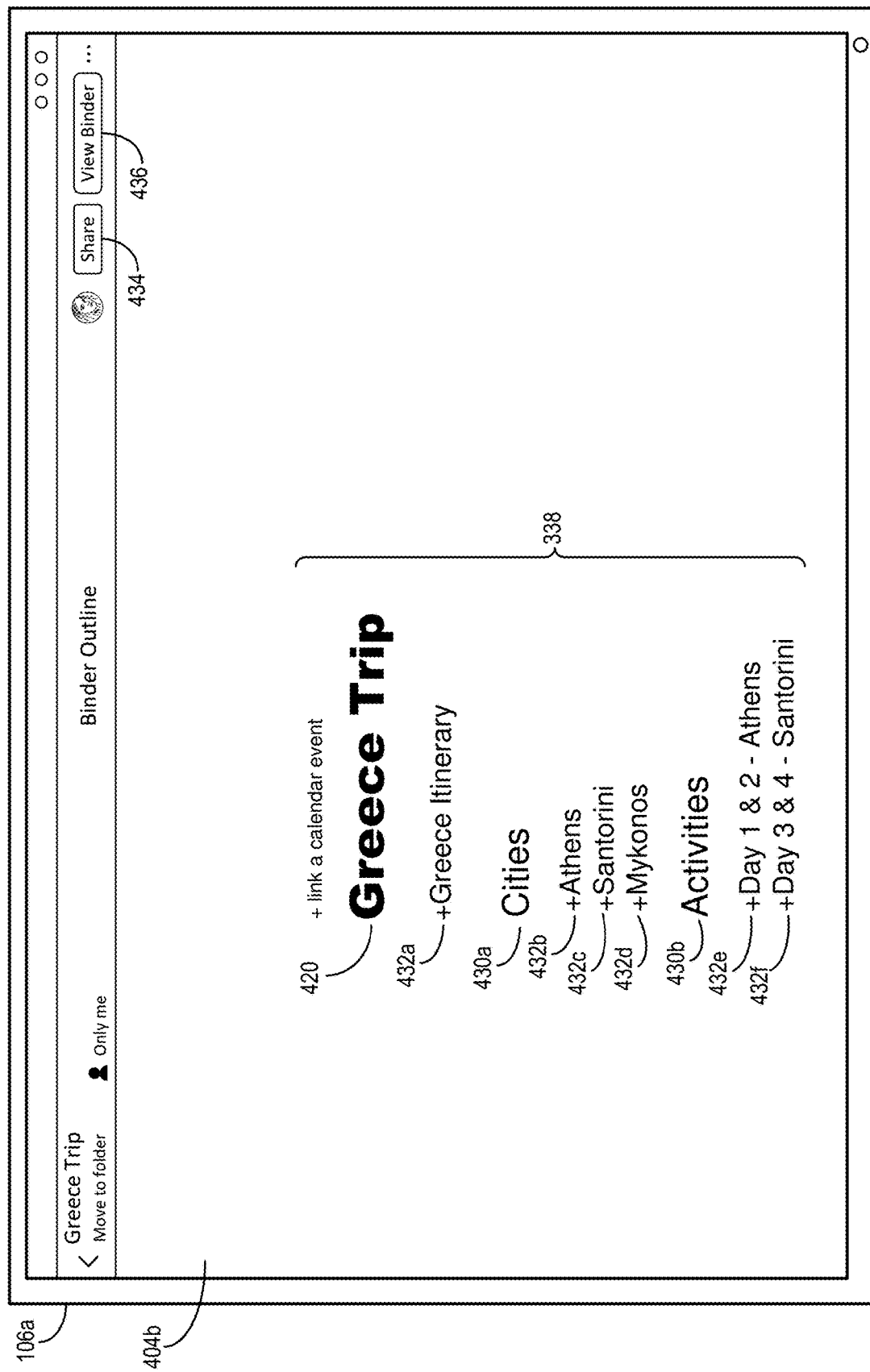

For example, as shown in FIG. 4F, collection content item configuration GUI 404*b* can include a share button 434. In response to a detected selection of share button 434, content management system 104 can provide the collection content item displayed via collection content item configuration GUI 404*b* to one or more additionally selected users in display mode. For example, when a collection content item is shared in response to a detected selection of share button 434, content management system 104 may not enable access to the collection content item in edit mode (e.g., as shown in FIGS. 4A-4F). Instead, content management system 104 may only enable access to the collection content item in edit mode.

Periodically during configuration of a collection content item, a user may wish to toggle between edit mode and display mode. For example, as shown in FIG. 4F, collection content item configuration GUI 404*b* also includes view binder button 436. In one or more embodiments, content management system 104 can provide the collection content item in collection content item configuration GUI 404*b* in display mode in response to a detected selection of view binder button 436.

Figure 4G:
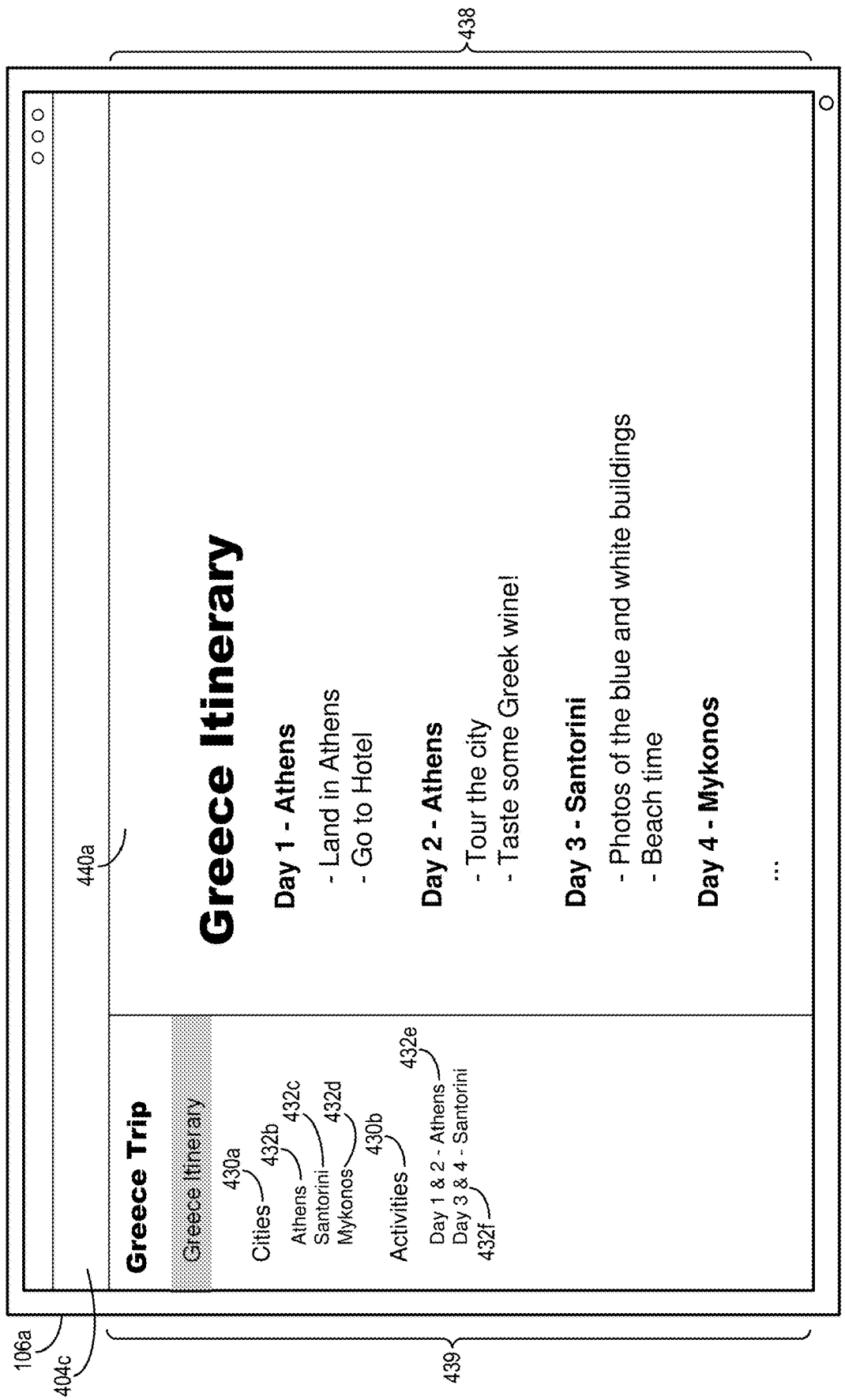

FIG. 4G illustrates the collection content item in display mode. For example, while in display mode, content management system 104 collection content item display GUI 404*c* associated with the collection content item. As shown in FIG. 4G, collection content item display GUI 404*c* includes table of contents display area 439 (e.g., including table of contents 338) and content item display area 438 (e.g., including a rendering of a selected content item, as discussed further below).

While in display mode, content management system 104 can provide table of contents 338 of the collection content item with selectable, but non-editable display elements in table of contents display area 439. For example, as shown in FIG. 4G, content management system 104 provides table of contents 338 in table of contents display area 439 including title 420, subheadings 430*a*, 430*b*, and content item references 432*a*, 432*b*, 432*c*, 432*d*, 432*e*, and 432*f*. Whereas title 420, subheadings 430*a*, 430*b*, and content item references 432*a*, 432*b*, 432*c*, 432*d*, 432*e*, and 432*f* were editable while the collection content item was in edit mode (e.g., as in FIG. 4F), content management system 104 does not provide title 420, subheadings 430*a*, 430*b*, and content item references 432*a*, 432*b*, 432*c*, 432*d*, 432*e*, and 432*f* for editing while the collection content item is in display mode, as shown in FIG. 4G.

In response to a detected selection of one of the content item references 432*a*-432*f*, content management system 104 can update content item display area 438 to include a display of the content item associated with the selected content item reference. For example, as shown in FIG. 4G, in response to a detected selection of content item reference 432*a*, content management system 104 determines a digital location referenced by content item reference 432*a* and identifies the content item at that digital location. In one or more embodiments, content management system 104 generates rendering 440*a* of the identified content item and displays rendering 440*b* within content item display area 438.

Figure 4H:
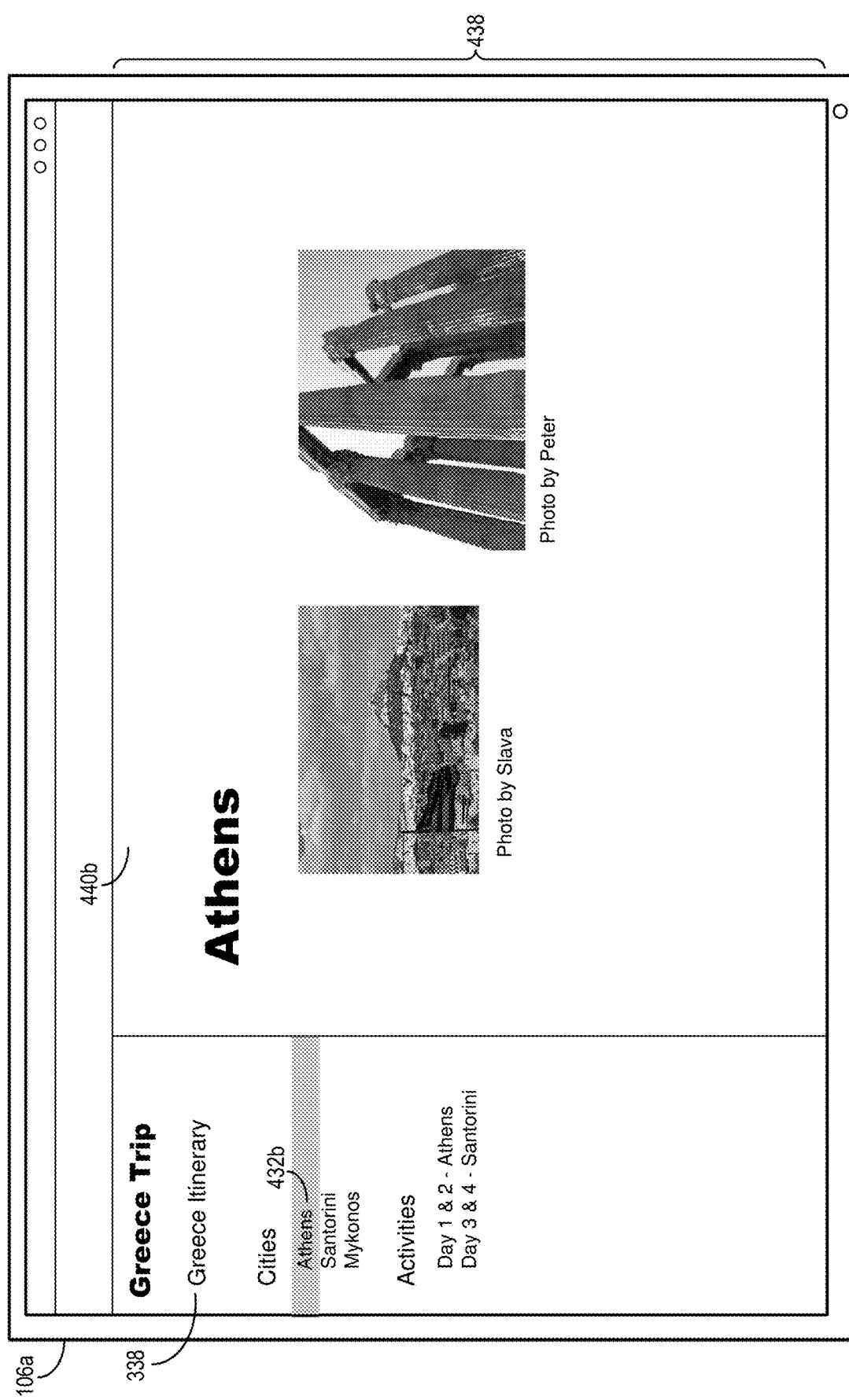

As shown in FIG. 4H, content management system 104 can quickly update content item display area 438 in response to a detected selection of another content item reference. For example, in response to a detected selection of content item reference 432*b* within table of contents 338, content management system 104 can determine the digital location referenced by content item reference 432*b*, identify the content item at that digital location, and generate rendering 440*b* of the identified content item.

Figure 4I:
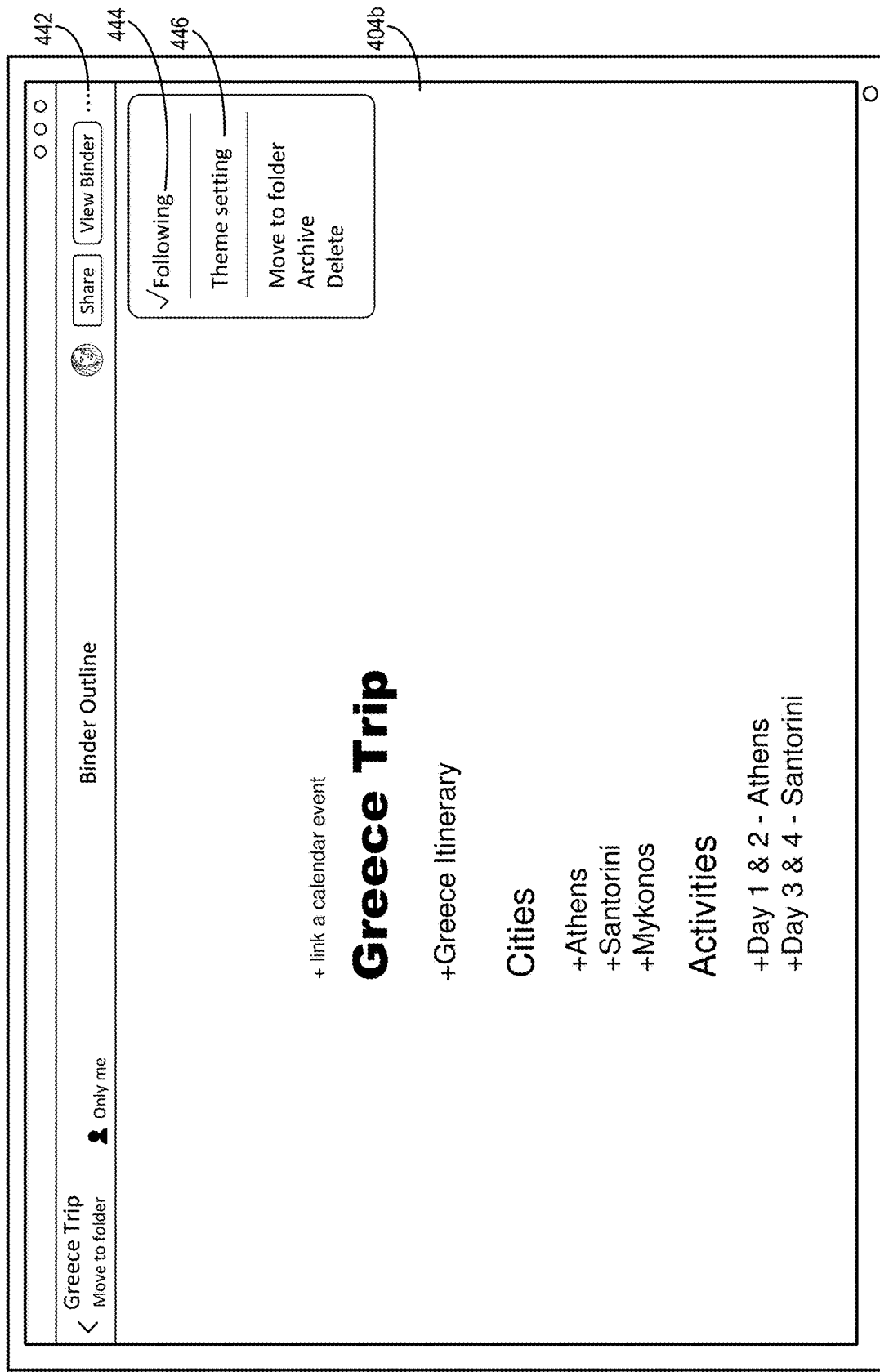

In one or more embodiments, content management system 104 provides additional tools for configuring collection content items. For example, as shown in FIG. 4I, in response to a detected selection of more button 442, content management system 104 can provide additional options 444. In one or more embodiments, content management system 104 can enable additional options in connection with the collection content item such as, but not limited to, display theme options, sharing options, permission options, and additional editing options (e.g., HTML editing options, CSS editing options).

Figure 4J:
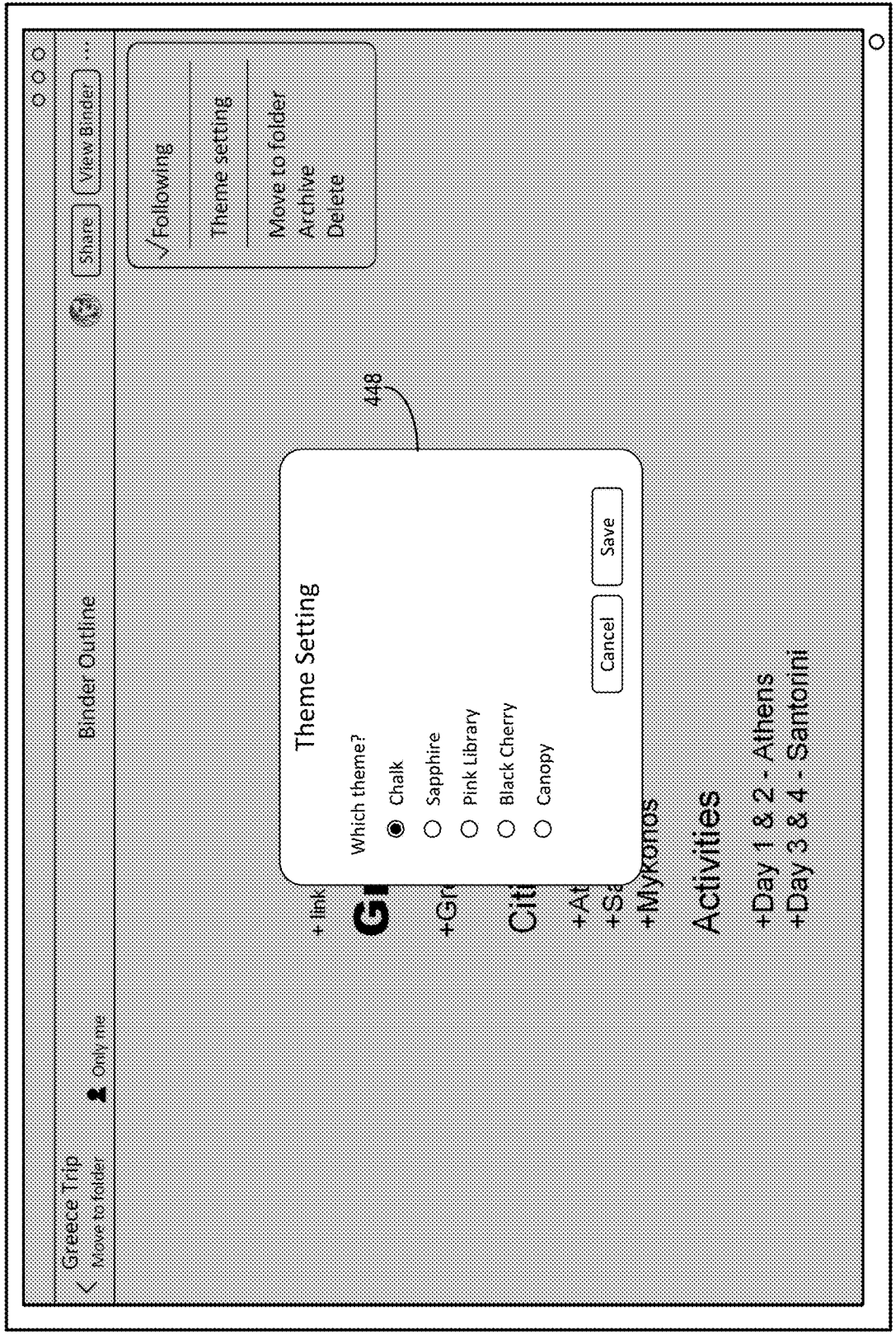
Figure 4K:
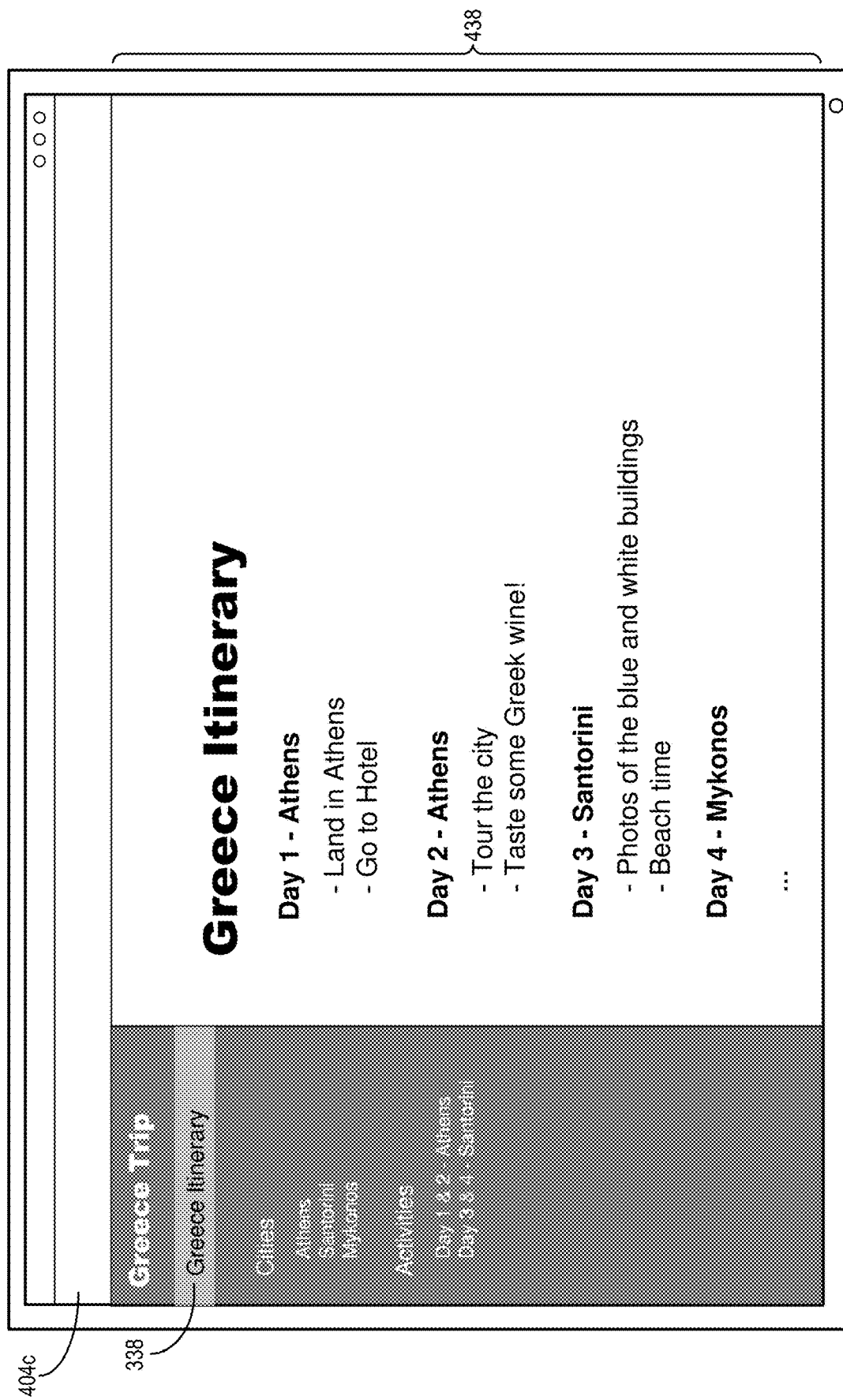

To further illustrate, in response to a detected selection of the theme setting option 446, content management system 104 can provide additional theme settings. For example, as shown in FIG. 4J, content management system 104 can provide selectable theme settings list 448. In response to a detected selection of one of the displayed themes in theme settings list 448, content management system 104 can apply preformatted display settings to the collection content item. To illustrate, as shown in FIG. 4K, content management system 104 can change display colors, font size, font type, formatting, and other display features of the collection content item while in display mode. It should be noted, however, that while content management system 104 modifies display settings associated with the collection content item, content management system 104 does not modify the functionality of any of the content item references.

Figure 4L:
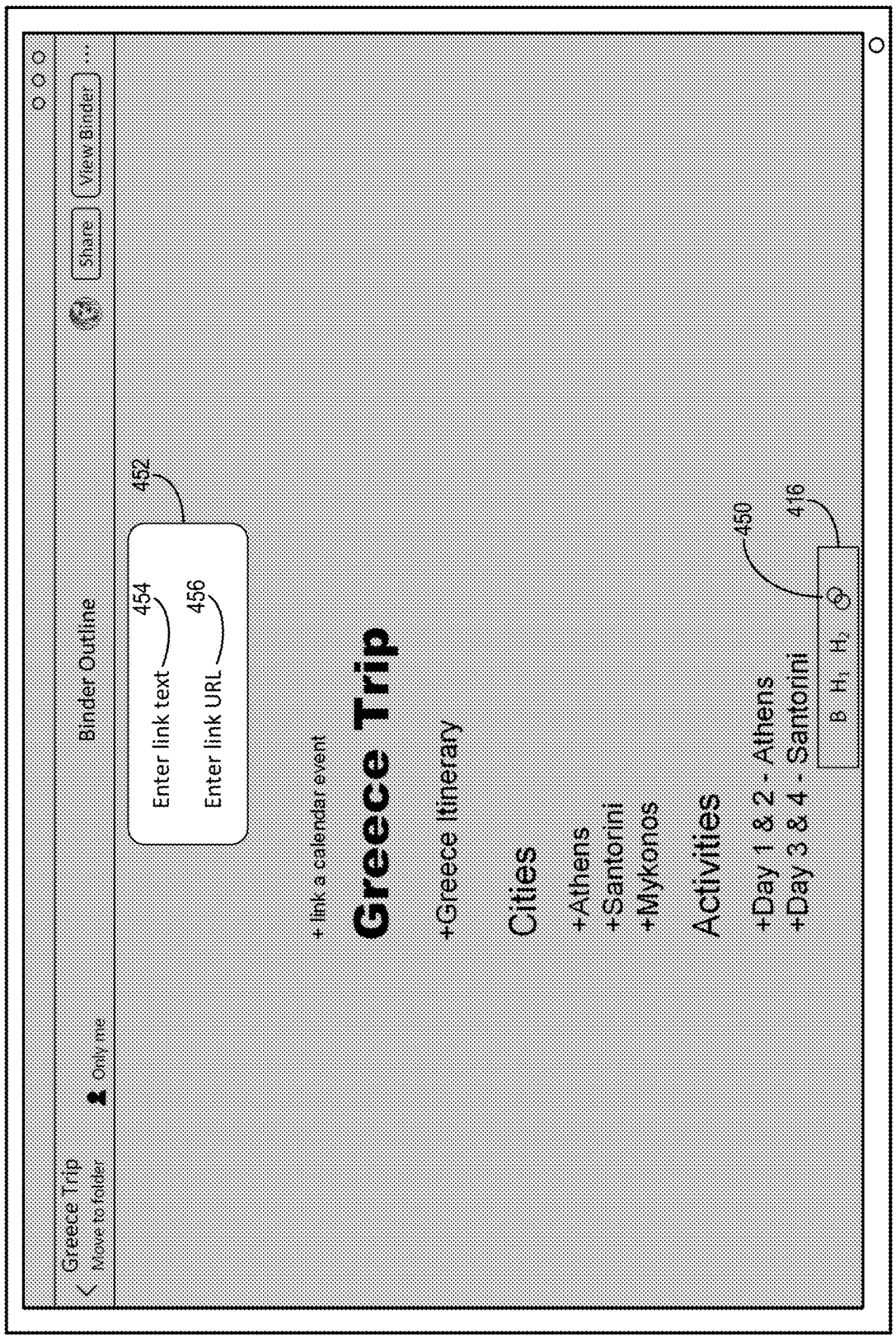

In one or more embodiments, content management system 104 enables a user to quickly add third party content items to a collection content item. For example, as shown in FIG. 4L, in response to a detected selection of hyperlink button 450 in toolbox 416, content management system 104 can provide hyperlink configuration box 452. As shown, hyperlink configuration box 452 can include link text input 454 and link URL input 456. In at least one embodiment, as shown in FIG. 4M, content management system 104 can detect a user inputting text associated with a hyperlink (e.g., the hyperlinked text displayed to a user) into link text input 454. Similarly, as shown in FIG. 4M, content management system 104 can detect a user inputting text associated with a URL (e.g., a uniform resource locator) into link URL input 456.

In response to receiving input via link text input 454 and link URL input 456, content management system 104 can add a hyperlinked content item to the collection content item. For example, as shown in FIG. 4N, content management system 104 can add content item reference 432*g* to table of content 338. Once the collection content item is in display mode and in response to a detected selection of content item reference 432*g*, content management system 104 can generate and provide a rendering of the web page associated with the URL entered as part of content item reference 432*g*.

Figure 5:
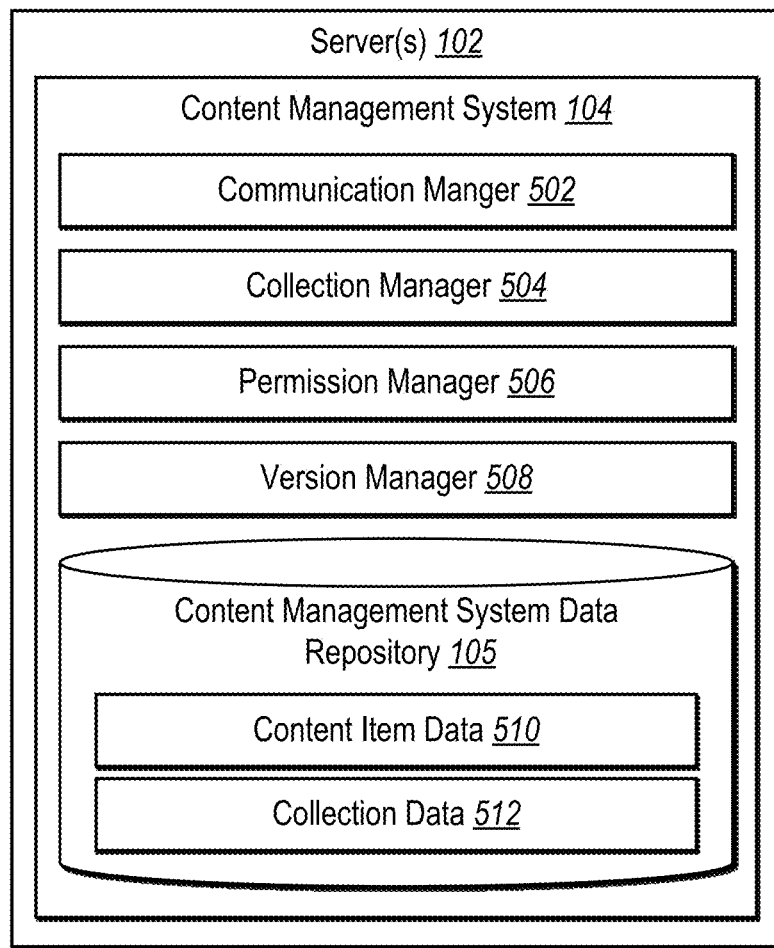
FIG. 5 illustrates a schematic diagram of the content management system in accordance with one or more embodiments described herein.

FIG. 5 illustrates a schematic diagram of content management system 104 hosted by server(s) 102. As shown, content management system 104 can include communication manager 502, collection manager 504, permission manager 506, and version manager 508. In one or more embodiments, content management system 104 can access content management system data repository 105 including digital content item data 510 and collection data 512.

Components 502-508 of content management system 104 can comprise software, hardware, or both. For example, components 502-508 can comprise one or more computer-executable instructions stored on a computer readable storage medium and executable by one or more processors of one or more computing devices. When executed by the one or more processors, the one or more computer-executable instructions of content management system 104 can cause a computing device(s) to perform the features and methods described herein. Alternatively, components 502-508 can comprise a special purpose processing device to perform a certain function or group of functions. Additionally, or alternatively, components 502-508 can comprise a combination of computer-executable instructions and hardware. Although the features and functionality of content management system 104 is described in relation to server(s) 102, part or all of the features and functionality of content management system 104 can reside on and be performed by a client computing device.

As mentioned above, and as shown in FIG. 5, content management system 104 includes communication manager 502. In one or more embodiments, communication manager 502 handles communications between content management system 104 and one or more client computing devices. For example, communication manager 502 can receive collection content item requests and indications of selected content item references from client computing devices. Furthermore, communication manager 502 can provide generated collection content items and content item renderings from content management system 104 to one or more client computing devices.

As mentioned above, and as shown in FIG. 5, content management system 104 includes collection manager 504. In one or more embodiments, collection manager 504 generates new collection content items. For example, as discussed above, collection manager 504 generates a collection content item by identifying a digital location associated with at least one indicated content item and generating a selectable content item reference pointing to that digital location. Collection manager 504 can embed the selectable content item reference into the collection content item.

Collection manager 504 can further generate the collection content item to include titles, sub-headings, and other embedded content. For example, collection manager 504 can generate the collection content item to include a table of contents including formatted text and selectable content item references. Additionally, collection manager 504 can generate the collection content item based on configured display metadata associated with the collection content item. For example, configured display metadata may include HTML and/or CSS associated with the collection content item that specifies an appearance of the collection content item, once generated. Accordingly, collection manager 504 can process this additional display metadata in order to generate the collection content item.

In one or more embodiments, collection manager 504 also identifies requested collection content items. For example, in response to receiving a request for an existing collection content item, collection manager 504 can identify the requested collection content item from content management system data repository 105. Collection manager 504 can further provide the requested collection content item via communication manager 504.

Furthermore, collection manager 504 can generate renderings of requested content items. For example, in response to a detected selection of a content item reference in a displayed collection content item, collection manager 504 can identify the content item at the digital location indicated by the content item reference. Collection manager 504 can further render the content item into a format readable by the content management system application installed on the requesting client computing device. Collection manager 504 can then provide the rendering of the content item to the requesting client computing device via communication manager 504.

As mentioned above, and as shown in FIG. 5, content management system 104 includes permission manager 506. In one or more embodiments, permission manager 506 handles all permission-related tasks associated with collection content items and the content items referenced therein. For example, in response to a received request for a collection content item and/or a content item within a collection content item, permission manager 506 can analyze metadata associated with the collection content item and/or the content item to determine if the requestor has adequate permission to access the collection content item and/or the content item. In at least one embodiment, permission manager 506 determines whether a requestor has adequate permission by comparing the requestor's user name, account identifier, access level, etc. against the metadata associated with the requested item.

Additionally, permission manager 506 can generate notifications associated with permissions. For example, in response to determining that a requestor does not have adequate permission to access a content item, permission manager 506 can generate a pop-up notification stating that permission is denied. Additionally or alternatively, permission manager 506 can disable one or more content item references within a collection content item based on whether the requestor has adequate permissions associated with those content items.

As mentioned above, and as shown in FIG. 5, content management system 104 includes version manager 508. In one or more embodiments, version manager 508 handles tasks related to one or more versions of content items within a collection content item. For example, in response to receiving an indication of a version action from a collection content item author or a content item author, version manager 508 can reference a specific version of all the content items within a collection content item or of a single content item. In one or more embodiments, version manager 508 references a specific version of a content item that includes the state of the content item at the time the version action was received. Version manager 508 can simultaneously maintain the live version of the content item from that point, enabling the author of the content item to continue editing the live content item while publishing the specific version via the collection content item.

Additionally, version manager 508 updates content item references within a collection content item based on received version action. For example, in response to receiving a version action relative to a specific content item within a collection content item, version manager 508 updates the corresponding content item reference within the collection content item to point to the digital storage location of the specific version. Thus, version manager 508 effectively locks the content item referenced in the collection content item to the specific version of the content item, while the content item author may continue to edit the live content item.

Version manager 508 also organizes and stores multiple versions of a content item. For example, a content item author may request multiple versions of a content item be made available to specific users, all while continuing to edit the live content item. Accordingly, version manager 508 can store and provide each version to the specified users, while maintaining the live version of the content item.

As mentioned above, content management system 104 interacts with content management system data repository 105. As shown in FIG. 5, content management system data repository 105 includes digital content item data 510 and collection data 512. In one or more embodiments, digital content item data 510 includes digital contents and digital content information, such as discussed above. Similarly, in one or more embodiments, collection data 512 includes collection content items and collection content item information, such as discussed above.

Figure 6:
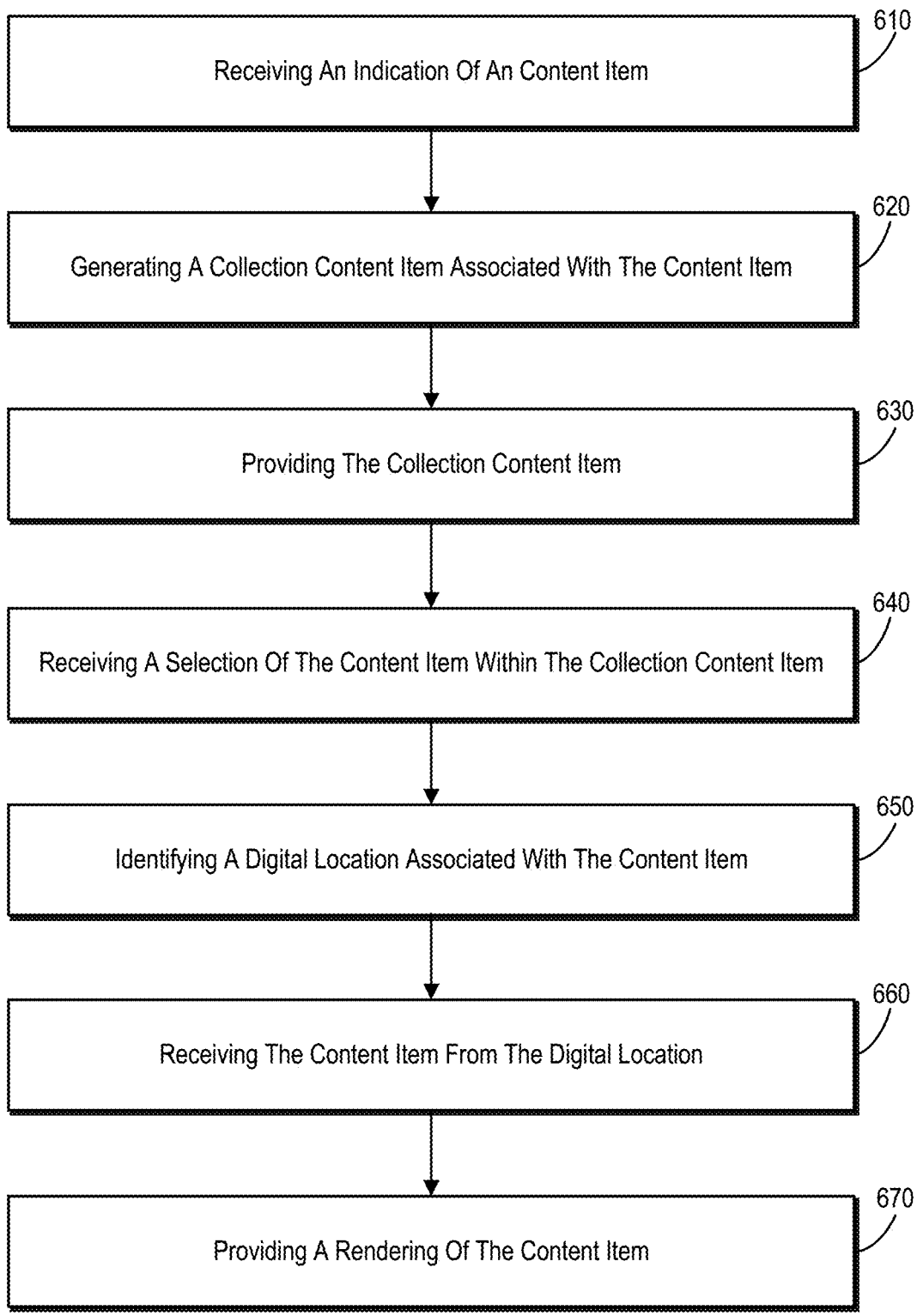
FIG. 6 illustrates a flowchart of a series of acts in a method of generating a collection content item in accordance with one or more embodiments described herein.

FIGS. 1-5, the corresponding text, and the examples, provide a number of different systems and devices for generating and utilizing collection content items. In addition to the foregoing, embodiments of the present disclosure can also be described in terms of flowcharts comprising acts and acts in a method for accomplishing a particular result. For example, FIG. 6 illustrates a flowchart of exemplary methods in accordance with one or more embodiments of the present disclosure. The methods described in relation to FIG. 6 may be performed with less or more acts/acts or the acts/acts may be performed in differing orders. Additionally, the acts/acts described herein may be repeated or performed in parallel with one another or in parallel with different instances of the same or similar acts/acts.

FIG. 6 illustrates a flowchart of one example method 600 of generating a collection content item. The method 600 includes an act 610 of receiving an indication of a content item. In particular, act 610 can involve receiving, from a client computing device, an indication of a first content item for inclusion in a content item collection. For example, receiving an indication of the first content item for inclusion in the collection content item can include receiving a selection of one of a cloud storage document, PDF document, a MS Office document, a web page, or a digital media file. Additionally, in at least one embodiment, receiving an indication of the first content item can include receiving the indication from within a display of the first content item that a new content item collection should be generated comprising the first content item.

Additionally, the method 600 includes an act 620 of generating a collection content item associated with the content item. In particular, act 620 can involve generating, in association with a user account corresponding with the client computing device, a collection content item associated with the first content item. For example, the method 600 can involve determining a digital location associated with the first content item. In one or more embodiments, generating the collection content item associated with the first content item can include adding, to the collection content item, the selectable reference to the digital location associated with the first content item. For instance, determining the digital location associated with the first content item comprises determining one or more of a digital location of the first content item within an online cloud storage system, a digital location of the first content item within a third party storage system, a digital location of the first content item within a file system on the client computing device, or a digital location of the first content item within an Internet web server.

In one or more embodiments, the method 600 includes receiving, from the client computing device, an indication of a second content item for inclusion in the content item collection. The method 600 can further include modifying the collection content item based on the indication of the second content item by: determining a digital location associated with the second content item, and adding, to the collection content item, a selectable reference to the digital location associated with the second content item.

Furthermore, the method 600 includes an act 630 of providing the collection content item. In particular, act 630 can involve providing the collection content item for display on the client computing device, wherein when displayed on the client computing device the collection content item comprises a selectable reference corresponding to the first content item.

Additionally, the method 600 includes an act 640 of receiving a selection of the content item within the collection content item. In particular, the act 640 can involve receiving, from the client computing device, an indication of a selection of the selectable reference corresponding to the first content item. For example, receiving the indication of the selection can include receiving an indication of a touch gesture or a mouse click.

The method 600 also includes an act 650 of identifying a digital location associated with the content item. In particular, the act 650 can involve identifying a digital location associated with the first content item. For example, identifying a digital location associated with the first content item can include identifying a digital storage location on a remote server or a local hard drive.

The method 600 further includes an act 660 of receiving the content item from the digital location. In particular, the act 660 can involve receiving the first content item from the digital location associated with the first content item. For example, receiving the first content item from the digital location can be in response to a file request.

Furthermore, the method 600 includes an act 670 of providing a rendering of the content item. In particular, the act 670 can involve providing a rendering of the first content item to the client computing device. For example, providing the rendering of the first content item can include determining a file type associated with the first content item, and generating, based on the file type, a rendering of the first content item. Additionally, in at least one embodiment, providing the rendering of the first content item can include providing the rendering of the first content item within a first display area of a graphical user interface and providing the selectable reference corresponding to the first content item in a second display area of the graphical user interface.

In one or more embodiments, the method 600 includes receiving, from the client computing device an indication of a selection of the selectable reference corresponding to the first content item. The method 600 can also include providing, to the client computing device, a rendering of the first content item, receiving, from the client computing device, one or more edits associated with the rendering of the first content item, and updating the first content item based on the one or more edits.

Additionally, in at least one embodiment, the method 600 includes receiving, from the client computing device, one or more edits associated with the first content item unrelated to the collection content item. The method 600 can further include updating the first content item based on the one or more edits at the digital location associated with the first content item.

In one or more embodiments, the method 600 also includes receiving, from a second client computing device, a request for the collection content item, determining a permission setting for the first content item and a permission setting for the second content item, determining a permission setting associated with the second client computing device, providing, within the collection content item and based on the permission setting associated with the first content item and the permission setting associated with the second client computing device, the selectable reference to the digital location associated with the first content item, and withholding, within the collection content item and based on the permission setting associated with the second content item and the permission setting associated with the second client computing device, the selectable reference to the digital location associated with the second content item.

Moreover, in one or more embodiments, the method 600 includes receiving, from the client computing device, a version action in connection with the first content item in the collection content item, generating, in response to receiving the version action, a first version of the first content item, updating the selectable reference associated with the first content item within the collection content item to be associated with a digital location associated with a fixed version of the first content item, and enabling further editing of a live version of the first content item. In at least one embodiment, the method 600 also includes receiving, from a second client computing device, a request for the first content item in the collection content item, and providing the fixed version of the first content item to the second client computing device based on the selectable reference being associated with the digital location of the fixed version of the first content item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

A processor can include any processing unit or device that processes instructions in a computing system. For example, a processor can include, but is not limited to, one or more of a central processing unit, a graphics processing unit, a field programmable gate array, an accelerated processing unit, a digital signal processor, or an integrated processor. A computing system can also include any number of processors for processing individually (e.g., by a single processor) or together (e.g., by a plurality of different processors or processor cores).

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RANI and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
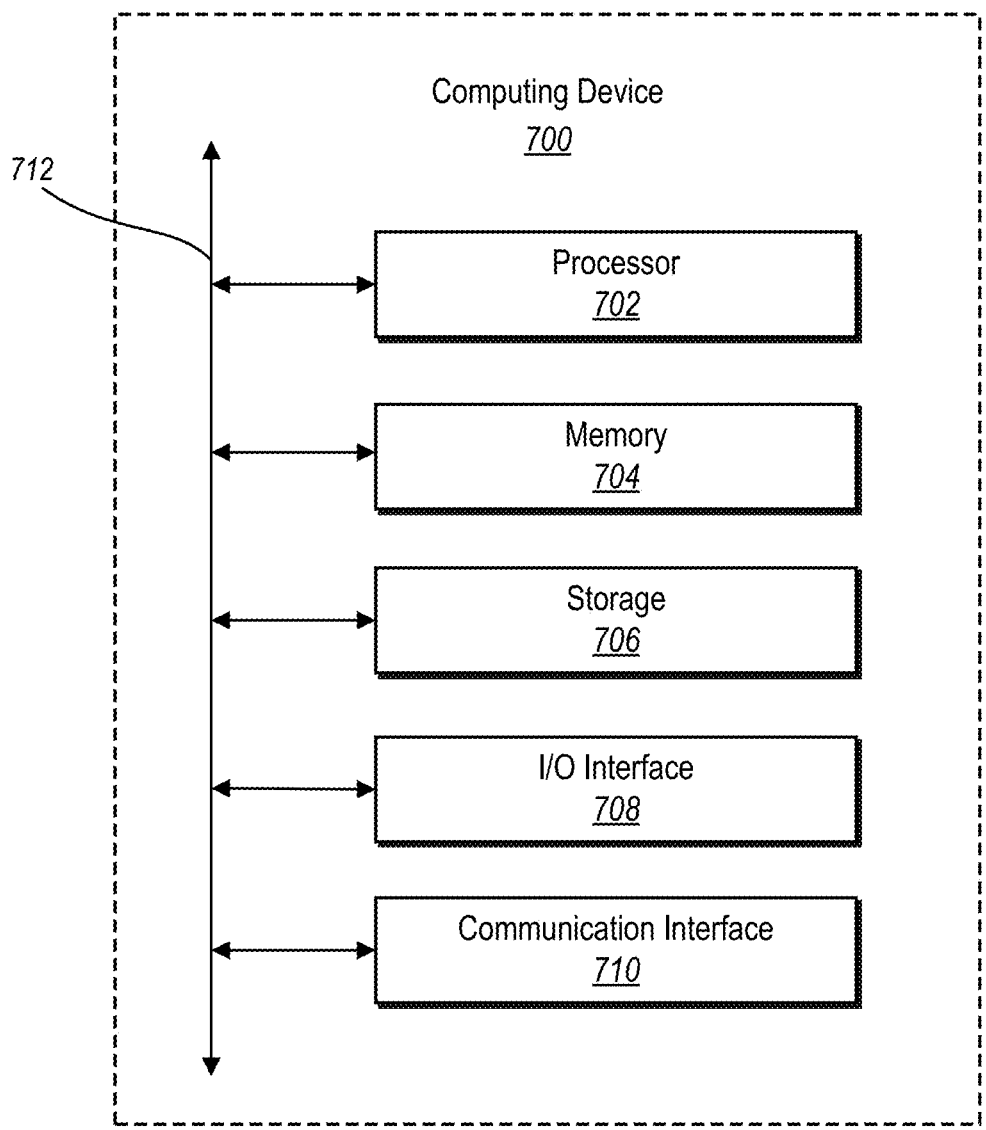
FIG. 7 illustrates a block diagram of an exemplary computing device in accordance with one or more embodiments described herein.

FIG. 7 illustrates a block diagram of exemplary computing device 700 that may be configured to perform one or more of the processes described above. One will appreciate that client devices described herein and/or the content management system 104 may comprise one or more computing devices such as computing device 700. As shown by FIG. 7, computing device 700 can comprise processor 702, memory 704, storage device 706, I/O interface 708, and communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage device 706 and decode and execute them. In particular embodiments, processor 702 may include one or more internal caches for data, instructions, or addresses. As an example and not by way of limitation, processor 702 may include one or more instruction caches, one or more data caches, and one or more translation lookaside buffers (TLBs). Instructions in the instruction caches may be copies of instructions in memory 704 or storage 706. Additionally, processor 702 can include or represent one or more processors or processor cores.

Memory 704 may be used for storing data, metadata, and programs for execution by the processor(s). Memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 704 may be internal or distributed memory.

Storage device 706 includes storage for storing data or instructions. As an example and not by way of limitation, storage device 706 can comprise a non-transitory storage medium described above. Storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to computing device 700. In particular embodiments, storage device 706 is non-volatile, solid-state memory. In other embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 712 may include hardware, software, or both that couples components of computing device 700 to each other. As an example and not by way of limitation, communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 8:
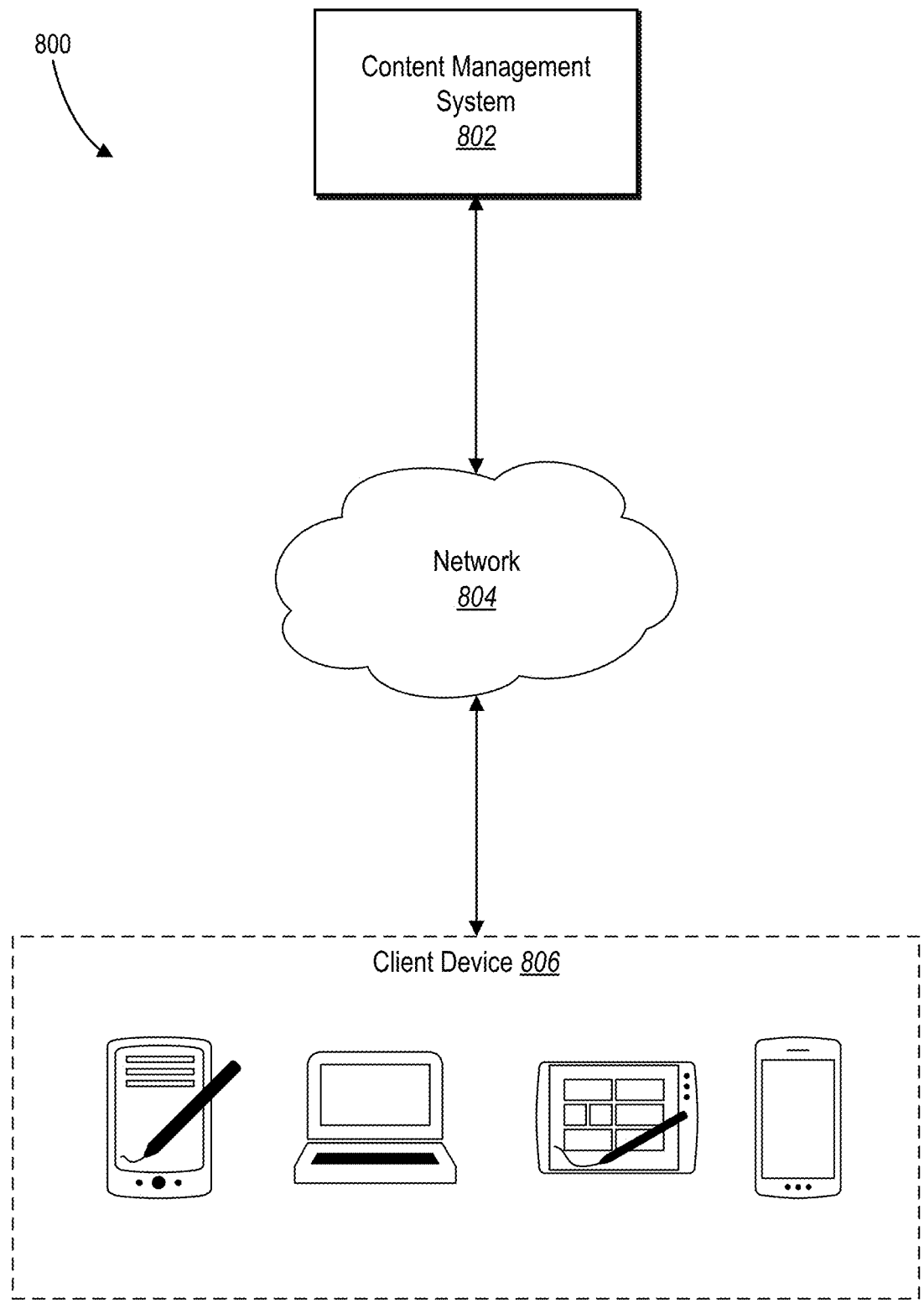
FIG. 8 is an example network environment of a social network management system in accordance with one or more embodiments described herein.

FIG. 8 is a schematic diagram illustrating an environment within which one or more embodiments of content management system 104 can be implemented. For example, as shown in FIG. 8, content management system 802 (e.g., content management system 104) may generate, store, manage, receive, and send digital content (such as digital videos). For example, content management system 802 may send and receive digital content to and from client devices 806 by way of network 804. In particular, content management system 802 can store and manage a collection of digital content. Content management system 802 can manage the sharing of digital content between computing devices associated with a plurality of users. For instance, content management system 802 can facilitate a user sharing a digital content with another user of content management system 802.

In particular, content management system 802 can manage synchronizing digital content across multiple client devices 806 associated with one or more users. For example, a user may edit digital content using client device 806. The content management system 802 can cause client device 806 to send the edited digital content to content management system 802. Content management system 802 then synchronizes the edited digital content on one or more additional computing devices.

In addition to synchronizing digital content across multiple devices, one or more embodiments of content management system 802 can provide an efficient storage option for users that have large collections of digital content. For example, content management system 802 can store a collection of digital content on content management system 802, while the client device 806 only stores reduced-sized versions of the digital content. A user can navigate and browse the reduced-sized versions (e.g., a thumbnail of a digital image) of the digital content on client device 806. In particular, one way in which a user can experience digital content is to browse the reduced-sized versions of the digital content on client device 806.

Another way in which a user can experience digital content is to select a reduced-size version of digital content to request the full- or high-resolution version of digital content from content management system 802. In particular, upon a user selecting a reduced-sized version of digital content, client device 806 sends a request to content management system 802 requesting the digital content associated with the reduced-sized version of the digital content. Content management system 802 can respond to the request by sending the digital content to client device 806. Client device 806, upon receiving the digital content, can then present the digital content to the user. In this way, a user can have access to large collections of digital content while minimizing the amount of resources used on client device 806.

Client device 806 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access content management system 802.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
generating, for a user account within a content management system, a plurality of collection content items, wherein each of the plurality of collection content items is a shareable data file which includes references selectable to access content items stored in respective network locations;

providing, for display on a client device associated with the user account, the plurality of collection content items within a collection content item list;

receiving, from the client device associated with the user account, an indication of user interaction selecting a collection content item from among the plurality of collection content items in the collection content item list;

providing, in response to the user interaction selecting the collection content item from among the plurality of collection content items in the collection content item list, the collection content item for display on the client device associated with the user account;

receiving, from the client device associated with the user account, an indication of user interaction adding a content item to the collection content item;

based on the indication of the user interaction adding the content item, generating a reference for the content item and adding the reference to the collection content item;

based on a request to share the collection content item, providing access to the collection content item to an additional user account; and in response to an indication of the additional user account accessing the collection content item, providing, for display within the collection content item presented on an additional client device associated with the additional user account, a different set of the references than is viewable within the collection content item by the user account on the client device.

2. The method of claim 1, further comprising:

determining that a first access level of the user account is different from a second access level of the additional user account; and based on determining that the first access level is different from the second access level:

providing, for display within the collection content item presented on the client device, all of the references selectable to access the content items; and providing, for display within the collection content item presented on the additional client device, a subset of the references selectable to access the content items.

3. The method of claim 1, further comprising:

determining a modification to a certain content item associated with a corresponding reference included within the collection content item; and in response to the modification, updating the corresponding reference within the collection content item to indicate a modified version of the certain content item reflecting the modification.

4. The method of claim 1, further comprising:

receiving an indication of an edit to a certain content item associated with a corresponding reference included within the collection content item; and in response to the edit, generating a static version of the certain content item and a live version of the certain content item, wherein the corresponding reference included within the collection content item references one of the static version or the live version.

5. The method of claim 1, further comprising:

receiving the request to share the collection content item by receiving an indication of a user interaction to provide the collection content item to the additional user account; and providing the collection content item to an additional client device associated with the additional user account based on the user interaction to provide the collection content item to the additional user account.

6. The method of claim 1, further comprising:

determining respective file types associated with the content items accessible via the collection content item;

generating visualizations for the references selectable to access the content items according to the respective file types; and providing the collection content item for display on the client device such that the references selectable to access the content items are represented within the collection content item using the visualizations.

7. The method of claim 1, further comprising:

determining permissions associated with the respective network locations where the content items are stored; and applying the permissions to the references within the collection content item according to the respective network locations such that only user accounts with access to a certain network location can access a content item stored at the certain network location via a corresponding reference associated with the content item.

8. A system comprising:

at least one processor; and a non-transitory computer-readable medium storing instructions thereon that, when executed by the at least one processor, cause the system to:

generate, for a user account within a content management system, a plurality of collection content items, wherein each of the plurality of collection content items is a shareable data file which includes references selectable to access content items stored in respective network locations;

provide, for display on a client device associated with the user account, the plurality of collection content items within a collection content item list;

receive, from the client device associated with the user account, an indication of user interaction selecting a collection content item from among the plurality of collection content items in the collection content item list;

provide, in response to the user interaction selecting the collection content item from among the plurality of collection content items in the collection content item list, the collection content item for display on the client device associated with the user account;

receive, from the client device associated with the user account, an indication of user interaction adding a content item to the collection content item;

based on the indication of the user interaction adding the content item, generate a reference for the content item and adding the reference to the collection content item;

based on a request to share the collection content item with an additional user account, provide the collection content item to an additional client device associated with the additional user account; and in response to an indication of the additional user account accessing the collection content item, provide, for display within the collection content item presented on an additional client device associated with the additional user account, a different set of the references than is viewable within the collection content item by the user account on the client device.

9. The system of claim 8, further storing instructions that, when executed by the at least one processor, cause the system to:
  receive an indication of an edit to a certain content item associated with a corresponding reference included within the collection content item; and
  in response to the edit, automatically updating the corresponding reference within the collection content item to indicate a live version of the certain content item reflecting edits as they are made.

10. The system of claim 8, further storing instructions that, when executed by the at least one processor, cause the system to generate the collection content item by:
  generating a first set of references for content items stored in network locations within the content management system;
  generating a second set of references for content items stored in network locations outside the content management system; and
  adding the first set of references and the second set of references to the collection content item.

11. The system of claim 8, further storing instructions that, when executed by the at least one processor, cause the system to:
  determine a modification to a certain content item associated with a corresponding reference included within the collection content item; and
  in response to the modification, update the corresponding reference within the collection content item to indicate a modified version of the certain content item reflecting the modification.

12. The system of claim 8, further storing instructions that, when executed by the at least one processor, cause the system to:
  receive an indication of an edit to a certain content item associated with a corresponding reference included within the collection content item; and
  in response to the edit, generate a static version of the certain content item and a live version of the certain content item, wherein the corresponding reference included within the collection content item references the static version.

13. The system of claim 8, further storing instructions that, when executed by the at least one processor, cause the system to receive the request to share the collection content item by receiving an indication of a user interaction to provide the collection content item to the additional user account as a digital file.

14. The system of claim 8, further storing instructions that, when executed by the at least one processor, cause the system to:
  determine respective file types associated with the content items accessible via the collection content item;
  generate visualizations for the references selectable to access the content items according to the respective file types; and
  provide the collection content item for display on the client device such that the references selectable to access the content items are represented within the collection content item using the visualizations.

15. A non-transitory computer-readable medium storing instructions that, when executed, cause at least one computing device to:
  generate, for a user account within a content management system, a plurality of collection content items, wherein each of the plurality of collection content items is a shareable data file which includes references selectable to access content items stored in respective network locations;
  provide, for display on a client device associated with the user account, the plurality of collection content items within a collection content item list;
  receive, from the client device associated with the user account, an indication of user interaction selecting a collection content item from among the plurality of collection content items in the collection content item list;
  provide, in response to the user interaction selecting the collection content item from among the plurality of collection content items in the collection content item list, the collection content item for display on the client device associated with the user account;
  receive, from the client device associated with the user account, an indication of user interaction adding a content item to the collection content item;
  based on the indication of the user interaction adding the content item, generate a reference for the content item and adding the reference to the collection content item;
  based on a request to share the collection content item with an additional user account, provide the collection content item as a digital file to an additional client device associated with the additional user account; and
  in response to an indication of the additional user account accessing the collection content item, provide, for display within the collection content item presented on an additional client device associated with the additional user account, a different set of the references than is viewable within the collection content item by the user account on the client device.

16. The non-transitory computer-readable medium of claim 15, further storing instructions that, when executed, cause the at least one computing device to generate the collection content item by:
  generating a first set of references for content items stored in network locations within the content management system;
  generating a second set of references for content items stored in network locations outside the content management system; and
  adding the first set of references and the second set of references to the collection content item.

17. The non-transitory computer-readable medium recited in claim 15, further storing instructions that, when executed, cause the at least one computing device to:
  determine respective file types associated with the content items accessible via the collection content item;
  generate visualizations for the references selectable to access the content items according to the respective file types; and
  provide the collection content item for display on the client device such that the references selectable to access the content items are represented within the collection content item using the visualizations.

18. The non-transitory computer-readable medium recited in claim 15, further storing instructions that, when executed, cause the at least one computing device to:

receive an indication of an edit to a certain content item associated with a corresponding reference included within the collection content item; and in response to the edit, generate a static version of the certain content item and a live version of the certain content item, wherein the corresponding reference included within the collection content item references the live version.

19. The non-transitory computer-readable medium recited in claim 15, further storing instructions that, when executed, cause the at least one computing device to:

determine permissions associated with the respective network locations where the content items are stored; and apply the permissions to the references within the collection content item according to the respective network locations such that only user accounts with access to a certain network location can access a content item stored at the certain network location via a corresponding reference associated with the content item.

20. The non-transitory computer-readable medium recited in claim 15, further storing instructions that, when executed, cause the at least one computing device to:

determine a modification to a certain content item associated with a corresponding reference included within the collection content item; and in response to the modification, update the corresponding reference within the collection content item to indicate a modified version of the certain content item reflecting the modification.

* * * * *